(12) United States Patent
Robertson

(10) Patent No.: US 7,165,714 B2
(45) Date of Patent: Jan. 23, 2007

(54) NETWORKED BUSINESS SYSTEM

(75) Inventor: Philip Keith Robertson, Middle Cove (AU)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 10/362,584

(22) PCT Filed: Aug. 31, 2001

(86) PCT No.: PCT/AU01/01102

§ 371 (c)(1),
(2), (4) Date: Jun. 16, 2003

(87) PCT Pub. No.: WO02/19263

PCT Pub. Date: Mar. 7, 2002

(65) Prior Publication Data

US 2004/0099723 A1 May 27, 2004

(30) Foreign Application Priority Data

Sep. 1, 2000 (AU) .................................... PQ9825

(51) Int. Cl.
*G06F 17/00* (2006.01)
(52) U.S. Cl. ...................................... 235/375; 235/381
(58) Field of Classification Search ................ 235/375, 235/379, 380, 381, 383; 705/26, 27
See application file for complete search history.

(56) References Cited

U.S. PATENT DOCUMENTS

| | | | |
|---|---|---|---|
| 5,002,062 A | 3/1991 | Suzuki | 128/696 |
| 5,353,016 A | 10/1994 | Kurita et al. | 340/825.22 |
| 5,601,489 A | 2/1997 | Komaki | 463/44 |
| 5,880,769 A * | 3/1999 | Nemirofsky et al. | 725/139 |
| 5,949,492 A | 9/1999 | Mankovitz | 348/473 |
| 5,973,475 A | 10/1999 | Combaluzier | 320/107 |
| 5,987,612 A * | 11/1999 | Takagawa et al. | 713/201 |

(Continued)

FOREIGN PATENT DOCUMENTS

AU 1995-28896 2/1996

(Continued)

*Primary Examiner*—Ahshik Kim
(74) *Attorney, Agent, or Firm*—Fitzpatrick, Cella, Harper & Scinto

(57) ABSTRACT

A method of procuring goods and/or services using a merchant server coupled to a computer network is disclosed. The network (100) comprises at least one smart card (120) having a memory device (122) programmed with access information corresponding to and associated with one more icons (124) formed on a surface of the smart card (120). The smart card (120) is locatable with a reader device (160) coupled to the network (100) to permit a reading of the memory device (122) to associate the access information with one of the icons (124) selected by a user depressing a touch panel (162) of the reader (160) device overlying the icons (124). The method transmits the access information from the reader (160) to the merchant server (200) in response to selection of the one icon (124). The method utilises the merchant server (200) to provide the goods and/or services for retrieval by the user according to the access information. The method monitors the transmission of the access information to the merchant server (200) and invoices at least one user of the network (100) for costs associated with provision of the goods and/or services.

33 Claims, 20 Drawing Sheets

U.S. PATENT DOCUMENTS

| | | | |
|---|---|---|---|
| 6,014,593 A | 1/2000 | Grufman | 700/136 |
| 6,044,349 A * | 3/2000 | Tolopka et al. | 705/1 |
| 6,213,390 B1 * | 4/2001 | Oneda | 235/379 |
| 6,229,694 B1 | 5/2001 | Kono | 361/683 |
| 6,378,070 B1 | 4/2002 | Chan et al. | 713/155 |
| 6,529,453 B1 * | 3/2003 | Otsuka et al. | 369/30.32 |
| 6,535,294 B1 * | 3/2003 | Arledge et al. | 358/1.15 |
| 6,686,908 B1 * | 2/2004 | Kobayashi | 345/173 |
| 6,854,641 B1 * | 2/2005 | Takagi | 235/375 |
| 6,859,832 B1 * | 2/2005 | Gecht et al. | 709/224 |
| 6,874,683 B1 * | 4/2005 | Keronen et al. | 235/380 |
| 6,877,655 B1 * | 4/2005 | Robertson et al. | 235/375 |
| 6,891,635 B1 * | 5/2005 | Dutta | 358/1.15 |
| 6,934,841 B1 * | 8/2005 | Boyles et al. | 713/159 |
| 2001/0017616 A1 | 8/2001 | Kobayashi | 345/173 |
| 2001/0025278 A1 | 9/2001 | Yourlo et al. | 707/2 |
| 2002/0178128 A1 * | 11/2002 | Chen et al. | 705/400 |

FOREIGN PATENT DOCUMENTS

| | | |
|---|---|---|
| AU | 53578/00 | 4/2001 |
| DE | 3637684 | 5/1987 |
| EP | 0 469 581 A2 | 2/1992 |
| EP | 0 992 953 | 4/2000 |
| EP | 0 992 953 A2 | 4/2000 |
| JP | 59-123986 A | 7/1984 |
| JP | 3-71329 | 3/1991 |
| JP | 4-88547 A | 3/1992 |
| JP | 11-296327 | 10/1999 |
| WO | WO 95/35534 | 12/1995 |
| WO | WO 98/49658 | 11/1998 |
| WO | WO 00/14678 | 3/2000 |

* cited by examiner

| Field Number | Description (Card Header) |
|---|---|
| Magic Number | Two byte magic number. A constant that specifies this as being a valid card. Currently defined as the ASCII value for 'i' followed by the ASCII value for 'C'. |
| Version | One byte version number. Each version increment specifies a change in the card layout that can not be read by a reader that is compatible with lower versions of the layout. This document describes version 1(0x01) of the card format. |
| Reserved | This data is reserved for future use. Its value must be set to zero. |
| Flags | Four bytes of flags for this card. (See Fig. 13.) All non-assigned bits must be zero. |
| Distinguishing ID | Eight byte distinguishing identifier. Distinguishing identifiers include two fields - service identifier and service-specific identifier. The service identifier is five bytes and identifies the service associated with the card. The service-specific identifier is three bytes of service-specific value. |
| Number of Objects | One byte. The number of objects following this header. Can be zero. |
| Checksum | Card checksum, 2 bytes. The card checksum is sixteen bit, unsigned integer sum of all data bytes on the card excluding the checksum. |

Fig. 6

| Name | Description (Pre-Card Flag Values) | Value (hex) |
|---|---|---|
| Don't Beep | Stops the reader unit providing audio feedback by default. If this bit is set the reader will not issue any audio feedback when a UI element is pressed unless that element has the "INVERT BEEP" flag set in the UI Element object | 0x0000 0001 |
| No MOVE Events | Stops the reader unit from acting as a mouse when the user moves their finger around on the reader surface | 0x0000 0002 |
| No Event Co-ordinates | Stops the reader unit from sending co-ordinates for PRESS, RELEASE and MOVE events. X and Y values are sent with value zero. | 0x0000 0004 |

Fig. 7

| Name | Description (Object Header) | Length |
|---|---|---|
| Type | The type of object (see Fig. 16). | 1 byte |
| Object Flags | The general object flags that are associated with this object (see Fig. 15). Note: Additional flags specific to an object type are specified within the data field of the object. | 1 byte |
| Length | The length of the data following this object. This value can be zero. | 2 bytes |
| Data | The data associated with this object. The structure of this data is dependent on the type of object. | Variable |

Fig. 8

| Name | Description (Pre-Object Flag Values) | Value (hex) |
|---|---|---|
| Inactive | Indicates to the reader that the object is valid but is to be ignored regardless of it's type. | 0x01 |

Fig. 9

| Name | Description (Object Types) | Value (hex) |
|---|---|---|
| UI Object | A UICard button. | 0x10 |
| Card Data | Contains data that relates specifically to this card. | 0x20 |
| Fixed Length Data | An object that can be used to store fixed length blocks of data on the card. | 0x30 |
| Reader Insert | An object that can be used to give instructions to the reader when the card is inserted. | 0x40 |
| No Operation | An object that is used to fill blocks of empty space on the card. | 0x01 |
| No Operation (Single byte) | A single byte object that doesn't have a standard object header. Used to fill spaces on the card that are too small for a normal object header. | 0x00 |

Fig. 10

| Field | Description (User Interface Object Structure) | Size |
|---|---|---|
| Flags | Flags specific to this UI element on the card. | 1 byte |
| X1 | X value of the bottom-left hand corner co-ordinate of this object's rectangle. | 1 byte |
| Y1 | Y value of the bottom-left hand corner co-ordinate of this object's rectangle. | 1 byte |
| X2 | X value of the top-right hand corner co-ordinate of this object's rectangle. | 1 byte |
| Y2 | Y value of the top-right hand corner co-ordinate of this object's rectangle. | 1 byte |
| Data | Zero or more bytes of data associated with this object. The size of this field is determined by the object data size minus the combined size of the above fields. | Variable |

Fig. 11

| Name | Description (Flags for UI Object) | Value |
|---|---|---|
| Invert Beep Enable | This flag causes this button to have the inverse of the don't beep flag in the card header. If the Don't Beep flag isn't set in the header, this flag causes this button not to beep and vice versa. | 0x01 |
| Auto-repeats | Messages associated with this button automatically repeat when the press is held on the button. | 0x02 |
| Don't Send Data on Press | This causes this button not to send the data associated with this button in the press event. The default is to send the data associated with the button in the press event. | 0x04 |
| Don't Send Data on Release | This causes this button not to send the data associated with this button in the release event. The default is to send the data associated with the button in the release event. | 0x0a |

Fig. 12

| Field | Description (Message Header Format) | Bytes |
|---|---|---|
| Preamble | Preamble to the message. Value is always 0xAA 0x55 (bit sequence 10101010 01010101). This is to make it easier for the EM to find the beginning of a message. | 2 |
| Version | The version of the UICard IR message protocol this messages uses. This version of the protocol is version 1(0x01 in the version field.) | 1 |
| Type | Type of message. This is one of the values given in Fig. 20 | 1 |
| Reader ID | The 16 bit id of the reader that sent the message. This number is a pseudorandom generated number that is changed when the battery is replaced in the reader. This is needed to distinguish readers when multiple readers are being used with applications. | 2 |
| Service | Service identifier as stored on the card. | 5 |
| Service-specific | Service-specific identifier as stored on the card. | 3 |

Fig. 13

| Name | Description (Message Type Codes) | Code |
|---|---|---|
| INSERT | A card has been inserted into the reader. | 'I' |
| REMOVE | The card has been removed from the reader. | 'E' |
| PRESS | The touch panel has been pressed. | 'P' |
| RELEASE | The press on the tpouch panel has been released. | 'R' |
| MOVE | The press position has moved but the press has not been released. | 'M' |
| BADCARD | A card had been inserted however it has not passed validation | 'B' |
| LOW_BATT | The battery in the reader is getting flat. | 'L' |

Fig. 14

| Field | Description (Simple Message Format) | Bytes |
|---|---|---|
| Header | Message header as defined by Fig. 19. | 14 |
| Checksum | Message checksum. This is the sum of all the bytes in the message. | 1 |
| Checksum' | The 1's complement of the checksum. | 1 |

Fig. 15

| Field | Description (Move Message Format) | Bytes |
|---|---|---|
| Header | Message header as defined by Fig. 19. | 14 |
| X | The X co-ordinate of the touch position. | 1 |
| Y | The Y co-ordinate of the touch position. | 1 |
| Checksum | Message checksum. This is the sum of all the bytes in the message. | 1 |
| Checksum' | The 1's complement of the checksum. | 1 |

Fig. 16

| Field | Description (Press and Release Message Format) | Bytes |
|---|---|---|
| Header | Message header as defined by Fig. 19. | 14 |
| X | The X co-ordinate of the touch position. | 1 |
| Y | The Y co-ordinate of the touch position. | 1 |
| Length | The number of bytes of data. Can be zero. | 2 |
| Data | The data associated with the user interface element. | Length |
| Checksum | Message checksum. This is the sum of all the bytes in the message. | 1 |
| Checksum' | The 1's complement of the checksum. | 1 |

Fig. 17

NETWORKED BUSINESS SYSTEM

This is a national stage application under 35 U.S.C. 371 of PCT/AU01/01102 filed on Aug. 31, 2001.

TECHNICAL FIELD OF THE INVENTION

The present invention relates to networked printing arrangements and, in particular, to electronic smart cards being used to access and implement printing of desired information. The present invention also relates to the provision of other network goods/service and, in particular, to electronic smart cards being used to access and implement any desired goods or services.

BACKGROUND ART

The explosive growth of the Internet over recent years has resulted in many different types of traders offering for sale goods and services over the Internet. In many instances, goods offered for sale may be supplied or delivered electronically over the Internet and are often provided in the form of information that may be of immediate or direct use to Internet consumers. It is common for information to be printed by the user once the information is accessed from an Internet website of the seller.

The provision of such information (or other goods and services) over the Internet, and the consequential printing (or delivery) thereof, are not without problems. Specifically, where a user desires to purchase either an image or a text document, it is necessary for the user to perform a financial transaction with the seller, typically with the aid of a credit card facility and an interface to some financial institution. Further, such services can only be provided when the user has access to a computer terminal which provides direct access to the website of the seller and into which the user may input any password protection codes and the like. Whilst such an arrangement may not present substantial difficulty when the user has access to their own (eg. home or office) personal computing device, such is not the case when the user is mobile or otherwise at a location using a device where a personal computing device having the requisite Internet connection capabilities is unavailable.

A further difficulty with such arrangements is that the user must know the Internet location of the seller and the particular documents or images desired to be purchased. Where the specific Internet address (i.e. Uniform Resource Locator (URL)) is not known, the user must search for the location. Such a search is typically performed using a computer device, typically involving use of a browser application and entailing a certain amount of keyboard data entry of search parameters. Such a search may be time consuming and possibly unsuccessful.

SUMMARY OF THE INVENTION

It is an object of the present invention to substantially overcome, or at least ameliorate, one or more deficiencies of existing arrangements.

In accordance with one aspect of the present disclosure there is provided a networked printing system comprising:

at least one smart card having a memory device programmed with access information corresponding to and associated with one or more icons formed on a surface of said smart card;

a reader device coupled to a computer network, said smart card being locatable with said reader device to permit a reading of said memory device to associate said assess information with one of said icons selected by said user depressing a touch panel of said reader device overlying said icons;

a printer device coupled to said network and physically associated with said reader device;

a merchant server coupled to said network and configured to receive said access information from said reader in response to selection of said one icon, and in response thereto forward an electronic document for printing on said printer for retrieval by said user; and a transaction monitory service coupled to said network and configured to monitor the forwarding of said electronic document to said printer and to invoice at least one user of said network for costs associated with said printing.

In accordance with another aspect of the present disclosure there is provided a method of reproducing a document sourced from a merchant server coupled to a computer network, said network comprising at least one smart card having a memory device programmed with access information corresponding to and associated with one or more icons formed on a surface of said smart card, said smart card being locatable with a reader device coupled to said network to permit a reading of said memory device to associate said access information with one of said icons selected by a user depressing a touch panel of said reader device overlying said icons, said method comprising the steps of:

transmitting said access information from said reader to said merchant server in response to selection of said one icon; and forwarding an electronic document from said merchant server to a printer coupled to said network for printing on said printer and for retrieval by said user.

In accordance with still another aspect of the present disclosure there is provided a method of procuring goods and/or services using a merchant server coupled to a computer network, said network comprising at least one smart card having a memory device programmed with access information corresponding to and associated with one or more icons formed on a surface of said smart card, said smart card being locatable with a reader device coupled to said network to permit a reading of said memory device to associate said access information with one of said icons selected by a user depressing a touch panel of said reader device overlying said icons, said method comprising the steps of:

transmitting said access information from said reader to said merchant server in response to selection of said one icon;

utilising said merchant server to provide said goods and/or services for retrieval by said user according to said access information;

monitoring said transmission of said access information to said merchant server; and invoicing at least one user of said network for costs associated with provision of said goods and/or services.

In accordance with still another aspect of the present disclosure there is provided a network system for providing goods and/or services, said network system comprising:

at least one smart card having a memory device programmed with access information corresponding to and associated with one or more icons formed on a surface of said smart card;

a reader device coupled to a computer network, said smart card being locatable with said reader device to permit a reading of said memory device to associate said access information with one of said icons selected by said user depressing a touch panel of said reader device overlying said icons;

a merchant server coupled to said network and configured to receive said access information from said reader in response to selection of said one icon, and in response thereto enable provision of said goods and/or services for retrieval by said user; and a transaction monitory server coupled to said network and configured to monitor the forwarding of said access information to said merchant server and to invoice at least one user of said network for costs associated with said goods and/or services.

In accordance with still another aspect of the present disclosure there is provided a merchant server for sourcing goods and/or services, said merchant server being coupled to a computer network, said network comprising at least one smart card having a memory device programmed with access information corresponding to and associated with one or more icons formed on a surface of said smart card, said smart card being locatable with a reader device coupled to said network to permit a reading of said memory device to associate said access information with one of said icons selected by a user depressing a touch panel of said reader device overlying said icons, said merchant server being configured to receive said access information transmitted from said reader in response to selection of said one icon, and in response thereto enable forwarding of said goods and/or services for retrieval by said user.

In accordance with still another aspect of the present disclosure there is provided a transaction monitoring server for monitoring transactions on a network, said network comprising at least one smart card having a memory device programmed with access information corresponding to and associated with one or more icons formed on a surface of said smart card, said smart card being locatable with a reader device coupled to said network to permit a reading of said memory device to associate said access information with one of said icons selected by a user depressing a touch panel of said reader device overlying said icons, said transaction monitoring server being configured to monitor the forwarding of said access information transmitted from said reader in response to selection of said one icon, and to invoice at least one user of said network for costs associated with said forwarding of said access information.

In accordance with still another aspect of the present disclosure there is provided a program for reproducing a document sourced from a computer network, said network comprising at least one smart card having a memory device programmed with access information corresponding to and associated with one or more icons formed on a surface of said smart card, said smart card being locatable with a reader device coupled to said network to permit a reading of said memory device to associate said access information with one of said icons selected by a user depressing a touch panel of said reader device overlying said icons, said program comprising:

code for transmitting said access information from said reader to said merchant server in response to selection of said one icon; and forwarding an electronic document from said merchant server to a printer coupled to said network for printing said electronic document on said printer and for retrieval by said user.

In accordance with still another aspect of the present disclosure there is provided a program for procuring goods and/or services using a merchant server coupled to a computer network, said network comprising at least one smart card having a memory device programmed with access information corresponding to and associated with one or more icons formed on a surface of said smart card, said smart card being locatable with a reader device coupled to said network to permit a reading of said memory device to associate said access information with one of said icons selected by a user depressing a touch panel of said reader device overlying said icons, said program comprising:

code for transmitting said access information from said reader to said merchant server in response to selection of said one icon;

code for utilising said merchant server to provide said goods and/or services for retrieval by said user according to said access information;

code for monitoring said transmission of said access information to said merchant server; and code for invoicing at least one user of said network for costs associated with provision of said goods and/or services.

In accordance with still another aspect of the present disclosure there is provided a computer readable medium, having a program recorded thereon, where the program is configured to make a computer execute a procedure to reproduce a document sourced from a computer network, said network comprising at least one smart card having a memory device programmed with access information corresponding to and associated with one or more icons formed on a surface of said smart card, said smart card being locatable with a reader device coupled to said network to permit a reading of said memory device to associate said access information with one of said icons selected by a user depressing a touch panel of said reader device overlying said icons, said program comprising:

code for transmitting said access information from said reader to said merchant server in response to selection of said one icon; and forwarding an electronic document from said merchant server to a printer coupled to said network for printing said electronic document on said printer and for retrieval by said user.

In accordance with still another aspect of the present disclosure there is provided a computer readable medium, having a program recorded thereon, where the program is configured to make a computer execute a procedure to procure goods and/or services using a merchant server coupled to a computer network, said network comprising at least one smart card having a memory device programmed with access information corresponding to and associated with one or more icons formed on a surface of said smart card, said smart card being locatable with a reader device coupled to said network to permit a reading of said memory device to associate said access information with one of said icons selected by a user depressing a touch panel of said reader device overlying said icons, said program comprising:

code for transmitting said access information from said reader to said merchant server in response to selection of said one icon;

code for utilising said merchant server to provide said goods and/or services for retrieval by said user according to said access information;

code for monitoring said transmission of said access information to said merchant server; and code for invoicing at least one user of said network for costs associated with provision of said goods and/or services.

In accordance with still another aspect of the present disclosure there is provided a device for monitoring a transaction on a network, said device comprising:

a processor for monitoring transaction information sourced from a service provider that provides a service to a smart card user accessing said service provider using a smart card, said processor being configured to calculate a cost based on the transaction information.

In accordance with still another aspect of the present disclosure there is provided a computer executable program to be executed in a device for monitoring a transaction on a network, said program comprising:

code for monitoring transaction information sourced from a service provider that provides a service to a smart card user accessing said service provider using a smart card; and code for calculating a cost based on the transaction information.

In accordance with still another aspect of the present disclosure there is provided a computer executable program, which is used for a transaction monitoring apparatus for monitoring a transaction of a service requested through a network using a specific card, said specific card storing access information for requesting said service through said network, said program comprising:

code for monitoring the transaction executed on the network using the specific card; and code for generating invoice data to be charged to a service provider of said service based on said monitored transaction and the number of said specific cards issued.

Other aspects are also disclosed.

BRIEF DESCRIPTION OF THE DRAWINGS

One or more embodiments of the present invention will now be described with reference to the drawings, in which:

FIG. 6 shows a description of each of the fields of the header of FIG. 5;

FIG. 7 shows a description of each of the flags contained in the header of FIG. 5;

FIG. 8 shows a description for each of the fields of the object header for the card of FIG. 1;

FIG. 9 shows a description of the flag for the object header of FIG. 8;

FIG. 10 shows a description of each of the object types for the object header of FIG. 8;

FIG. 11 shows a description of each of the fields for a User Interface (UI) Object Structure according to the object header of FIG. 8;

FIG. 12 shows a description for each of the User Interface (UI) object flags according to the object header of FIG. 8;

FIG. 13 shows the format of a message header that is sent from the reader of FIG. 1;

FIG. 14 shows a table listing message event types for the header of FIG. 13;

FIG. 15 shows the format of a simple message;

FIG. 16 shows the format of a MOVE message;

FIG. 17 shows the format of PRESS and RELEASE messages;

DETAILED DESCRIPTION

Figure 1:
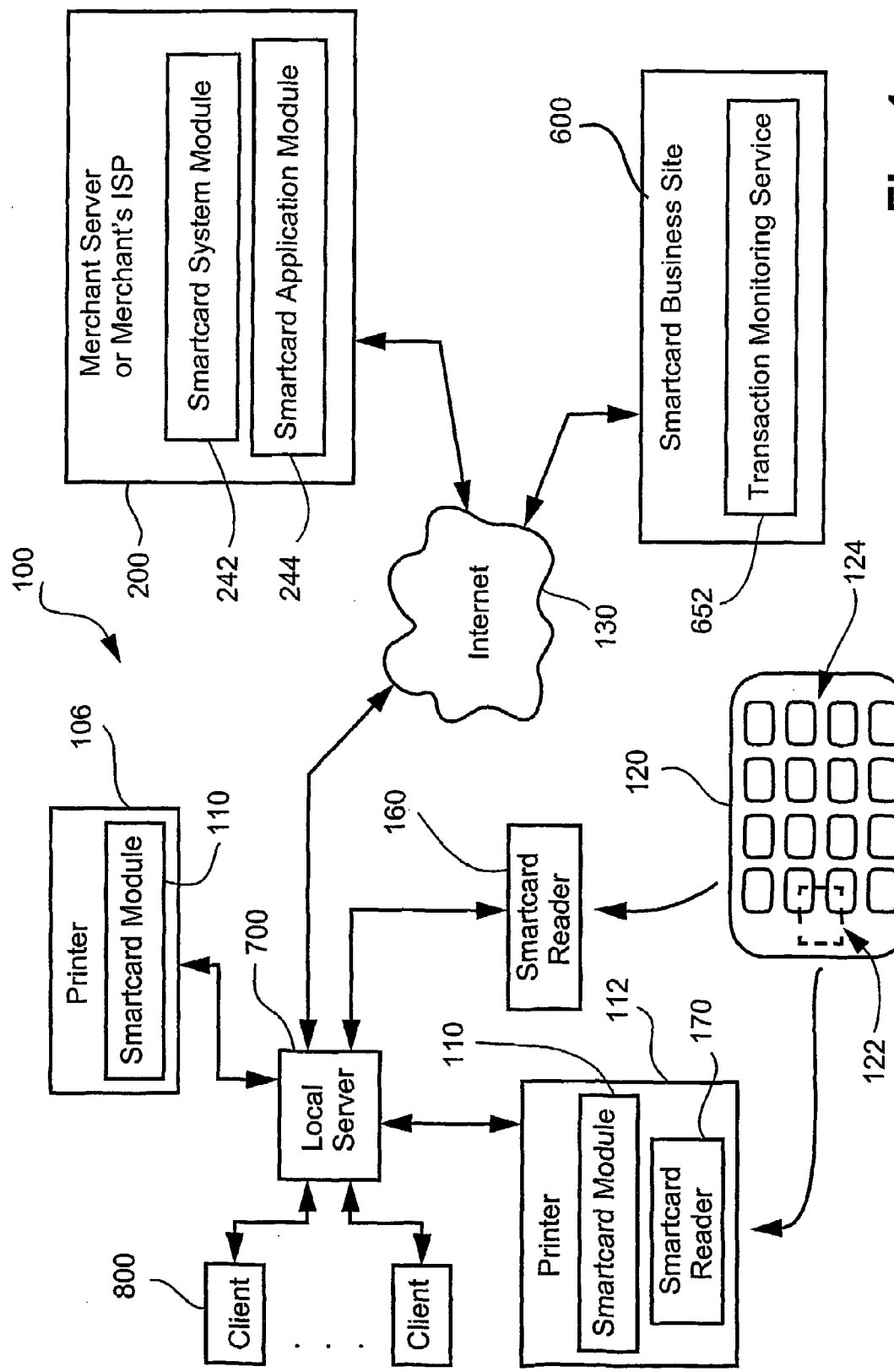
FIG. 1 is a schematic block diagram representation of a networked printing system.

FIG. 1 shows a network printing system 100 in which a local server 700 couples a number of client computer terminals 800 within a local network to an external network such as the Internet 130. Also arranged within the local network formed by the server 700 are a number of printers 106 and 112 with which users of the client computers 800 can print documents and images in a traditional fashion The local server 700, via coupling to the external computer network, such as the Internet 130 as illustrated, provides users of the client computers 800 with access to a merchant server or merchant ISP (Internet service provider) 200. With such an arrangement, users of the client computers 800 may purchase and download documents, images or other goods and services from the merchant server 200 in the traditional fashion discussed above.

The system 100 is supplemented by one or more smart card readers 160 and 170, into each of which may be inserted a smart card device 120 formed of a substrate incorporating a semiconductor memory device 122 and having printed or otherwise thereon a number of icons or symbols 124. The smart card reader 160 or printer 112 each comprise at least a processor (CPU) for executing software programs, read only memory (ROM) for storing the software programs and random access memory (RAM) for storing data to be processed by the CPU. The memory device 122 of the smart card 120 is configured to store access information (e.g. a Universal Resource Locator (URL)), identification information (e.g. a distinguishing identifier (ID) 510 as described below with reference to FIGS. 5 and 6), and mapping information associated with the particular icons 124. As will be explained in more detail below with reference to FIGS. 5 and 6, the distinguishing ID 510 includes a service identifier (ID) 506 for identifying a service (e.g. a specific URL) associated with the smart card device 120 and a service-specific identifier (ID) 507 for identifying a user of the smart card device 120 uniquely using a service-specific value. As illustrated in FIG. 1, the smart card reader 160 connects directly to the local server 700, whereas the smart card reader 170 is integrally formed within the printer 112. The smart card 120 is able to be read by the smart card readers 160 and 170 in a fashion that enables a holder of the smart card 120 to select and access, via the respective reader 160, 170, information and/or data corresponding to any one or more of the icons 124, so that the information so accessed, may be automatically printed on a corresponding one of the printers 106 and 112 without further user intervention. The merchant server 200 stores the smart card system module 242 and the smart card application module 244 (software program) in a memory medium such as a Hard Disk, CD-ROM and/or Floppy disk. The smart card business site 600 stores the transaction monitoring service module 652 (Software program) in a memory medium such as a hard disk, CD-ROM and/or floppy disk.

Figure 23:
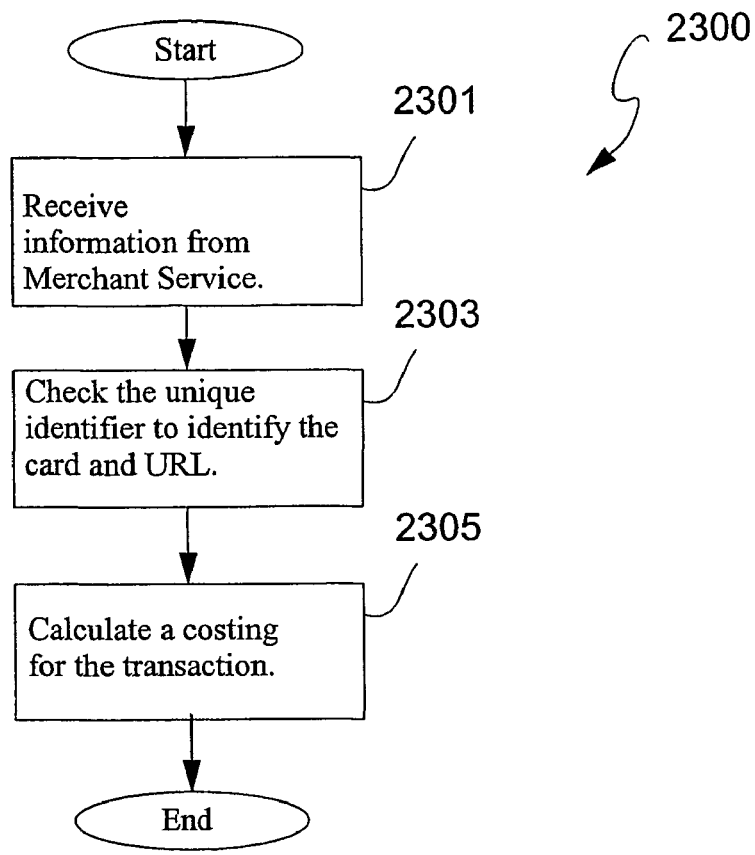
FIG. 23 is a flowchart showing a method of determining a costing for a transaction performed over the system of FIG. 1.
Figure 24:
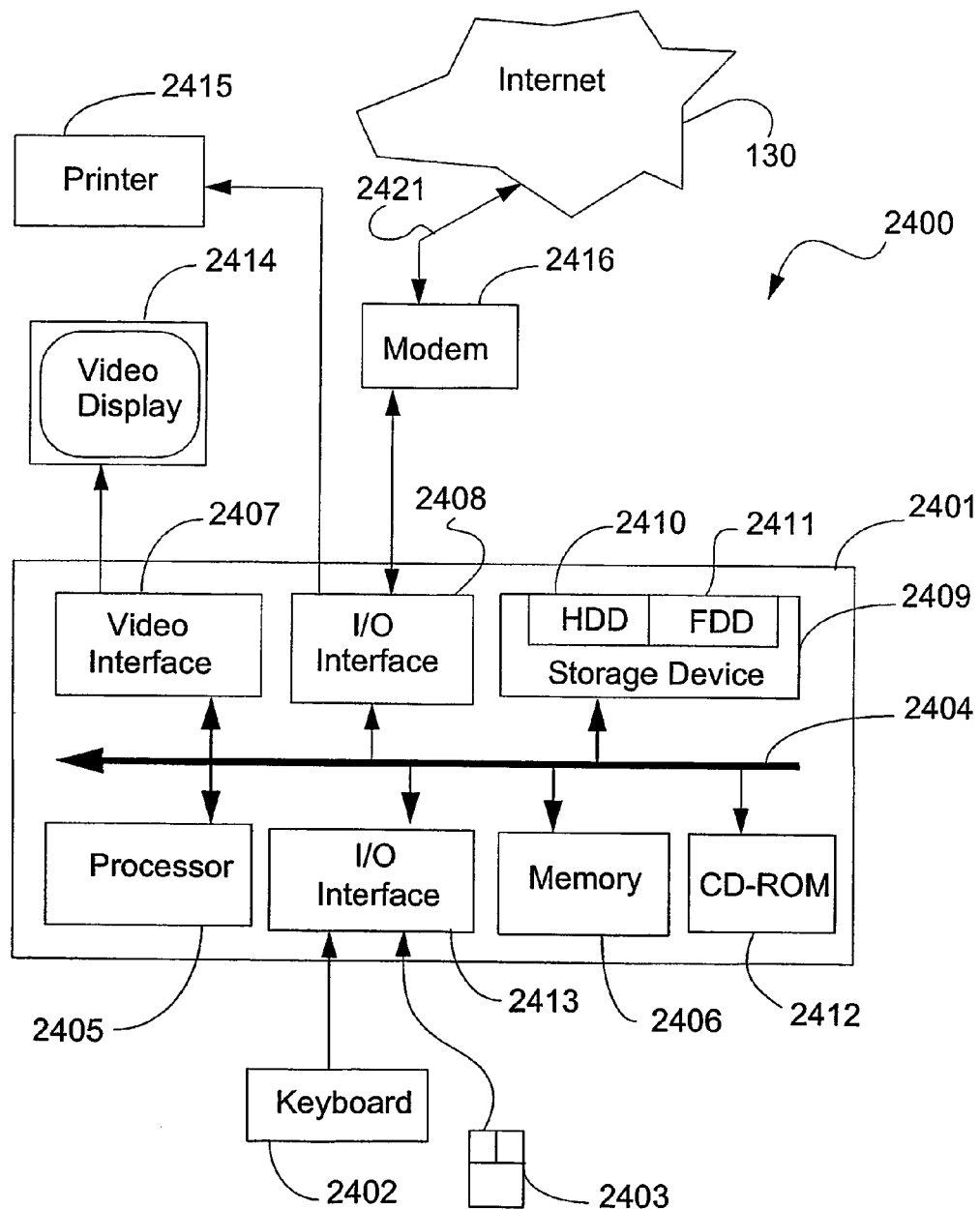
FIG. 24 is a schematic block diagram of a general purpose computer.

The merchant server 200, the local server 700, the client computer 800 and the smartcard business site 600 can each be implemented using a general-purpose computer system 2400, such as that shown in FIG. 24, or variations thereof. The methods described below can be practiced using each implementation of the general-purpose computer system 2400 wherein the processes of FIGS. 4, 20, 21, 22 and 23 may be implemented as software, for example by respective application programs executing within the respective implementations of the computer system 2400. Software programs represented by the flow charts of FIGS. 4, 19 21 and 22 are preferably executed by the CPU configured within the smart card reader 160 or by the CPU configured within the printer 112 including the smart card reader 170. In particular, the steps of the methods described herein can be effected by instructions in the software that are carried out by the respective computers. The instructions may be formed as one or more code modules, each for performing one or more particular tasks. The software may also be divided into two separate parts, in which a first part performs the described methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for performing the described methods.

The computer system 2400 comprises a computer module 2401, input devices such as a keyboard 2402 and mouse 2403, output devices including a printer 2415 and a display device 2414. A Modulator-Demodulator (Modem) transceiver device 2416 is used by the computer module 2401 for communicating to and from a computer network, such as the Internet 130, for example connectable via a telephone line 2421 or other functional medium. The modem 2416 can be used to obtain access to the Internet, and other network systems, such as a Local Area Network (LAN) or a Wide Area Network (WAN).

The computer module 2401 typically includes at least one processor unit 2405, a memory unit 2406, for example formed from semiconductor random access memory (RAM) and read only memory (ROM), input/output (I/O) interfaces including a video interface 2407, and an I/O interface 2413 for the keyboard 2402 and mouse 2403 and optionally a joystick (not illustrated), and an interface 2408 for the modem 2416. A storage device 2409 is provided and typically includes a hard disk drive 2410 and a floppy disk drive 2411. A magnetic tape drive (not illustrated) may also be used. A CD-ROM drive 2412 is typically provided as a non-volatile source of data. The components 2405 to 2413 of the computer module 2401, typically communicate via an interconnected bus 2404 and in a manner which results in a conventional mode of operation of the computer system 2400 known to those in the relevant art. Examples of computers on which the described arrangements can be practised include IBM-PC's and compatibles, Sun Sparcstations or alike computer systems evolved therefrom.

Typically, the software application programs are resident on the hard disk drive 2410 and read and controlled in their execution by the processor 2405. Intermediate storage of the program and any data fetched from the network 2420 may be accomplished using the semiconductor memory 2406, possibly in concert with the hard disk drive 2410. In some instances, the application program may be supplied to the user encoded on a CD-ROM or floppy disk (FDD) and read via the corresponding drive 2412 or 2411, or alternatively may be read by the user from the network 2420 via the modem device 2416. Still further, the software can also be loaded into the computer system 2400 from other computer readable media. The term "computer readable medium" as used herein refers to any storage or transmission medium that participates in providing instructions and/or data to the computer system 2400 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 2401. Examples of transmission media include radio or infra-red transmission channels as well as a network connection to another computer or networked device, and the Internet or Intranets including email transmissions and information recorded on websites and the like.

The methods described herein may alternatively be implemented in dedicated hardware such as one or more integrated circuits performing the functions or sub functions of the method of FIGS. 3, 4, 20, 21, 22 and 23. Such dedicated hardware may include graphic processors, digital signal processors, or one or more microprocessors and associated memories.

Figure 3:
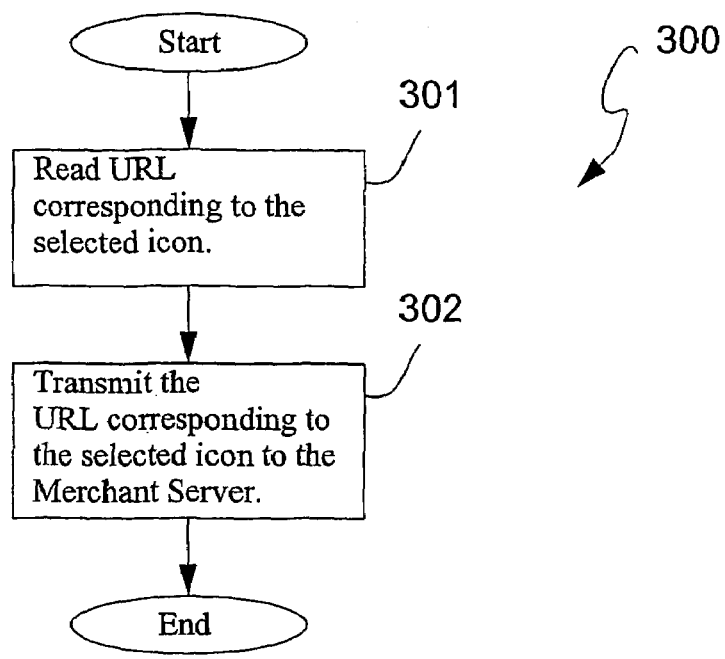
FIG. 3 is a flow chart showing a method of printing a document sourced over the system of FIG. 1.

FIG. 3 is a flow chart showing a method 300 of printing a document over the system 100 of FIG. 1. The method 300 transmits a URL corresponding to a user selected icon 24. The method 300 is performed by the smart card reader 160 or by the printer 112 in conjunction with the smart card reader 170. The method 300 is preferably executed by the CPU configured within the smart card reader 160 or printer 112 having smart card reader 170, when the smart card 120 is inserted into the smart card reader 160 or 170. The administrator of the merchant server 200 distributes smart cards 120 to prospective clients of the services provided by the merchant server 200. Such distribution may be via mail or hand-out. Those prospective clients may, for example, be existing subscribers to the merchant server 200. For example, where the merchant server 200 is a repository of image information, smart cards 120 produced and distributed therefrom may include as the icons 124 thumbnail sized low resolution representations of those images able to be purchased from the merchant server 200. In an alternative configuration, the merchant server 200 may be a publisher of a document that is periodically updated. When updates are published, rather than directly printing and mailing the updates to each subscriber, smart cards 120 may be distributed to the subscribers by which those subscribers may select one or more desired updates by means of the icons 124 printed thereon.

Figure 2:
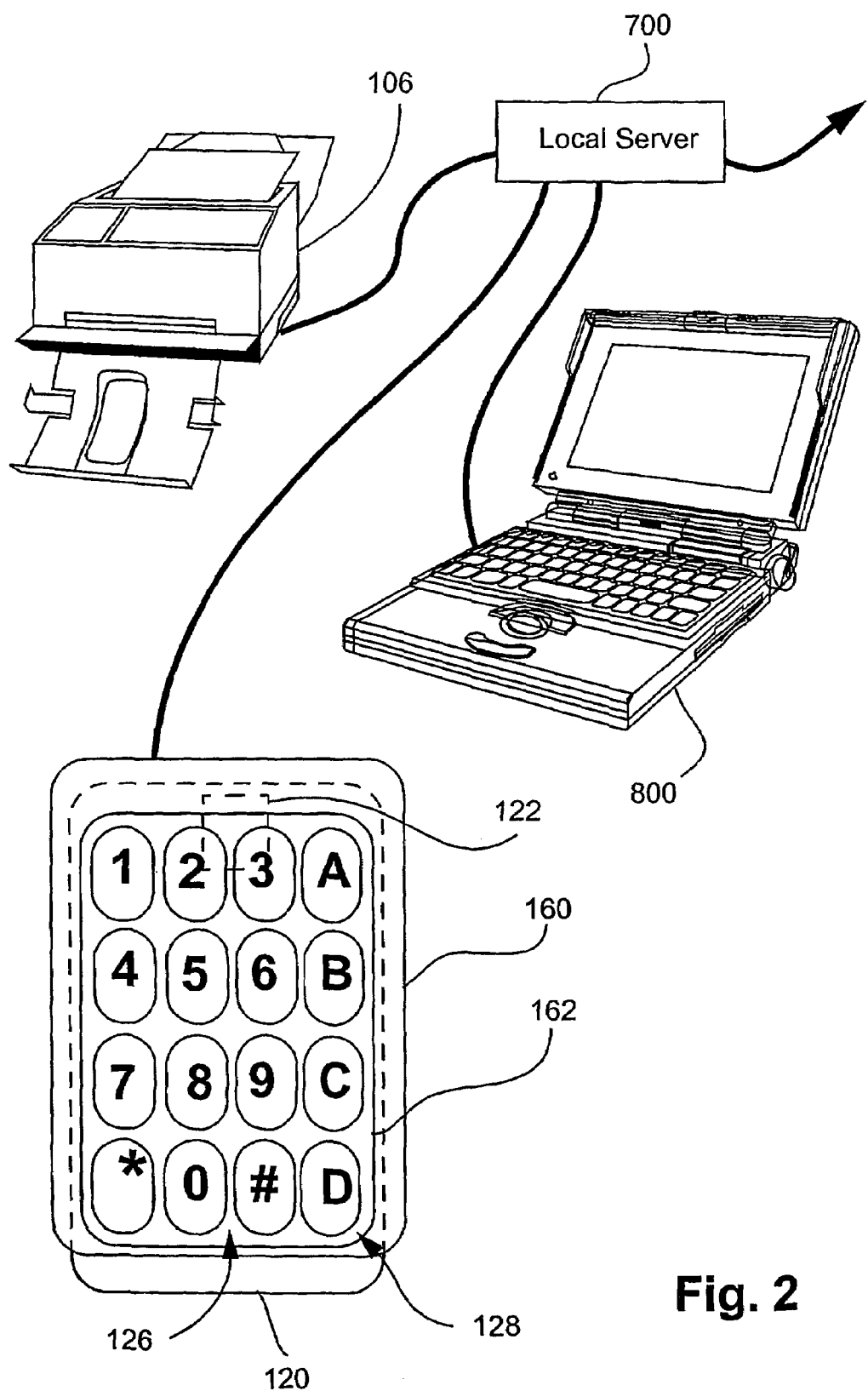
FIG. 2 illustrates a local arrangement of computing resources from the system of FIG. 1.

A holder of a smart card 120 (a user) inserts the smart card 120 into one of the smart card readers 160, 170 and selects a desired icon 124 according to the information that the user desires to retrieve from the merchant server 200. In this manner, the holder of the smart card 120 need not make use of a client computer 800 to retrieve the desired information from the merchant server 200. As seen in FIG. 2, the smart card reader 160, to which the reader 170 corresponds in functionality, is formed by a housing incorporating a slot configured to receive the smart card 120. Once inserted, the icons 124 of the smart card 120 are positioned beneath a transparent touch panel 162. Not illustrated in FIG. 2, the reader 160 provides for electrical connection to the memory device 122 which is pre-programmed with a mapping between the particular icons 124 and the touch sensitive matrix formed by the transparent touch panel 162. With this, a user may select the desired service by depressing the touch panel 162 over the corresponding icon 124 and the reader 160, 170 outputs a URL corresponding to the selected icon 124 and distinguishing ID of the smart card 120 al.

The method 300 begins at the step 301, where the CPU of the smart card reader 160 or printer 112 reads the output of the touch panel 162 and correlates the output with a corresponding URL stored within the memory device 122. The correlation of the output and the corresponding URL is performed using the mapping data stored within the memory device 122 (ie. the CPU reads the URL corresponding to the selected icon). At the next step 302, the CPU of reader 160 or printer 122 transmits the corresponding URL and distinguishing ID associated with the inserted card 120, to the merchant server 200 via the local server 700 and the Internet 130. The corresponding URL is transmitted to the merchant server 200 via the local server 700 using traditional protocols (TCP/IP and HTTP). The transmitted URL is used to interrogate an associated URL located within the merchant server 200 in order to retrieve the appropriate document stored within a memory medium (e.g. the storage device 2409) configured in the merchant server 200, and the merchant server 200 instructs the printing of the document on an associated printer 106, 112 having a corresponding network destination address.

Figure 4:
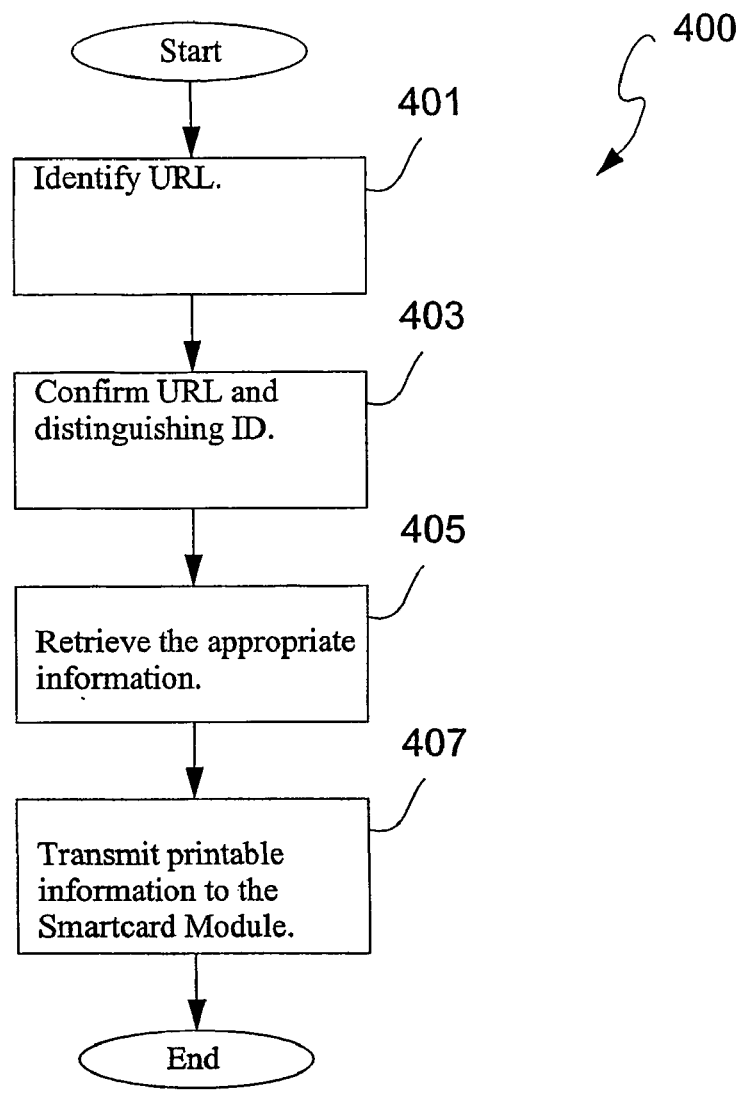
FIG. 4 is a flow chart showing a method of interrogating of the merchant server of FIG. 1.

FIG. 4 is a flow chart showing a method 400 of interrogating the merchant server 200. A software program corresponding to the method 400 is preferably stored in a memory medium (e.g. the storage device 2409, CD-ROM 2412, or FDD 2411) and is executed by a CPU (e.g. 2405) in the merchant server 200. The transmission of the (selected) URL is accompanied by a distinguishing ID 510 which identifies the particular holder of the smart card 120 in such a fashion that allows for that holder to be uniquely billed for the services provided through the selection of the appropriate icon 124. The distinguishing ID 510 (including a service ID 506 and service-specific ID 507) identifying the particular card holder, which is transmitted with the selected URL will be described in more detail below particularly with reference to FIGS. 5 to 17.

The method 400 begins at step 401, where upon receipt of the URL by the merchant server 200, a smart card system module 242 executing within the CPU of the merchant server 140, identifies the URL request as one arising from a smart card 120 forming part of the system 100, whereupon request is handled differently from traditional requests, for example those that may arise from the client computers 800. The smart card system module 242 is preferably stored in a memory medium (e.g. the HDD 2410, CD-ROM 2412 or FDD 2411) of the merchant server 200. At the next step 403, with the smart card request being identified, the system module 242 transfers the URL and distinguishing ID to an application module 244 whereupon the URL and distinguishing ID are confirmed together with a network destination address associated with the smart card reader 160 from which the request was made. The merchant server 240 is configured to recognise the network destination address and transmit appropriate printable information desired by the user. The user preferably has the network destination address designated in advance using a web browser executing within the local server 700 or merchant server 200. After initially setting up the network destination address, the user can subsequently change the network destination address using the web browser. At the next step 405, by executing the application module 244, the CPU of the merchant server 140 retrieves from the memory medium (e.g. the HDD 2410) in the merchant server 200, the appropriate printable information desired by the user. In step 407, by executing the application module 244, the merchant server 200 transmits the appropriate printable information, via the Internet 130, to the local server 700 corresponding to the network destination address of the printer 106 for printing on the printer 106. The printer 106 typically being physically associated (located near) with the smart card reader 160. The printer 106 includes a smart card module 110 enabling the printer 106 to directly receive printing commands not necessarily originating from within the local network formed about the local server 700, but specifically from the merchant server 200 via the application module 244. Upon receiving the printable information, the printer 106 can be configured to automatically print the information selected by the holder of the smart card 120.

Figure 22:
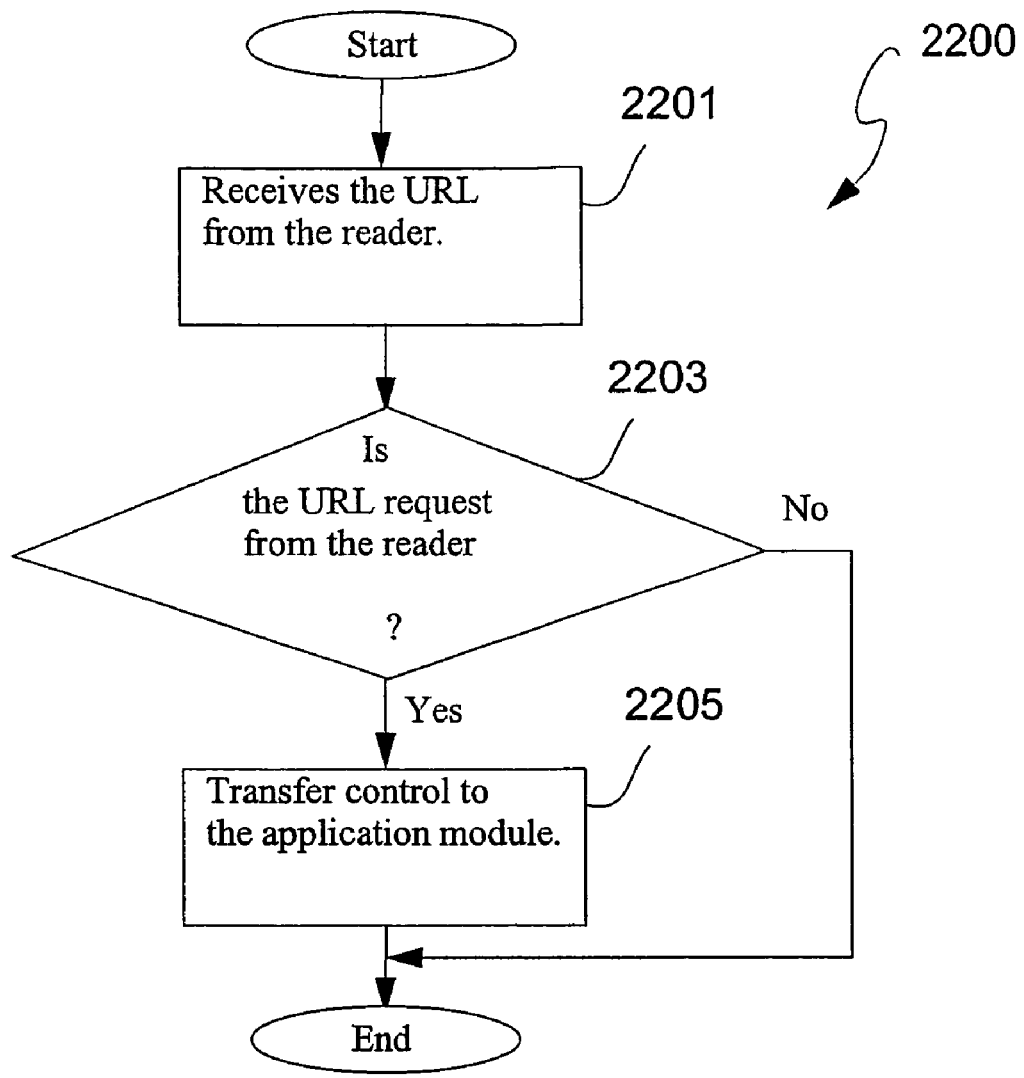
FIG. 22 is a flow chart showing a method of processing a URL received from a smart card reader of the system of FIG. 1.

FIG. 22 is a flow chart showing a method 2200 of processing the URL received from the reader 160 or printer 112. The method 2200 is performed utilising the smartcard system module 242 of the system 100. A software program according to the method 2200 is preferably stored in a memory medium (e.g. a HDD 2410, CD-ROM 2412 or FDD 2409) associated with the merchant server and is preferably executed by the CPU of the merchant server 200. At the first step 2201 of the method 2200, by executing the smart-card system module 242, the CPU of the merchant server 200 receives the URL corresponding to the icon 124 selected by the user and the distinguishing ID of the smart card 120, from the reader 160, 170. The method 2200 continues at the next step 2203, where if the URL request is one arising from a smart card 120 forming part of the system 100, then the method 2200 continues at the next step 2205. Otherwise, the URL request is deemed to have arisen from a one of the client computers 800, and the method 2200 concludes. At step 2205, the CPU of the merchant server 200 transfers control from the system module 242 to the application module 244 whereupon the URL and the distinguishing ID are confirmed together with a network destination address associated with the smart card reader 160 from which the request was made, and the method 2200 concludes.

Because the holder of the smart card 120 is known to the merchant server 200, the smart card printing request can be automatically processed so that the holder of the smart card 120 may be directly billed. The amount of the bill can be based on an amount per printed page. The billing may be performed directly via the merchant server 200 using traditional billing methods such as forwarding a monthly account or statement or by direct debiting a credit card in a traditional fashion. Alternatively, the bill may be transmitted as electronic data over the system 100 to a user designated client computer 104.

The smart card application module 244 also operates, upon delivering requested information to the destination printer (eg. 106) to provide details of the transaction being performed to a smart card business site 600, typically formed by a server connected to the Internet 130 as illustrated. Within the business site 600 is a transaction monitoring service 652 configured to record smart card transactions described above being performed within the system 100, utilising the resources of the merchant server 200. The smart card application module 244 of the merchant server 200 can be configured to transmit one or more data packets containing transaction information to the transaction monitoring service 652 of the smart card business site 600, when transmitting the requested information at step 407.

The type of transaction information which can be transmitted to the transaction monitoring service 652 in the data packets can include the distinguishing ID 510 of the smart card 120, a URL corresponding to the icon 124 selected by a user, a signal indicating a transaction confirmation, a number of pages to be transmitted and printed, the number or type of documents to be transmitted and printed, and/or the total size of data being transmitted. The distinguishing ID 510 will be explained in more detail below with reference to FIGS. 5 and 6. With such an arrangement, an administrator of the business site 600, who for example may program and otherwise manufacture smart cards 120 for distribution by the merchant server 200, is able to obtain a royalty (cost) on a transaction basis for those transactions completed by the merchant server 200. The programming and manufacturing of the smart cards 120 for an administrator of the merchant server 200 can be performed at a nominal cost to the administrator of the merchant server 200 or for free.

FIG. 23 is a flowchart showing a method 2300 of determining a costing for a transaction performed on the system 100. The method 2300 is performed utilising the transaction monitoring service 652. At the first step 2301 of the method 2300, by executing the transaction monitoring service 652, a CPU (e.g. 2405) associated with the business site 600 receives the transaction information transmitted from the application module 244. For example, the transaction information can include the distinguishing ID of the smart card 120, the URL corresponding to the selected icon 124, an administrator identifier to identify an administrator of the merchant server 200, the total number of times or period of time that the user accessed the URL and/or a transaction confirmation signal. The process continues at the next step 2303, where the CPU associated with the business site 600 checks the administrator identifier, distinguishing ID, the URL and the number of times that the user accessed the URL. At the next step 2305, the CPU associated with the business site 600 calculates a costing for the particular transaction based on the result of step 2303. For example, the CPU of the business site 600 can be configured to calculate the cost of the transaction as a royalty based on the number of times or period of time that the user accessed the URL. If the business site 600 programs and manufactures the smart card 120 having a popular URL, for the administrator of the merchant server 200, the business site 600 can get a large royalty from the administrator of the merchant server 200. Also, the CPU of the business site 600 may calculate the royalty according to a volume of smart cards 120 that the business site 600 programs and manufactures in conjunction with the relevant transaction information. For example, if the business site 600 programs and manufactures more than a predetermined number (e.g. 10000) smart cards, the CPU associated with the business site 600 may be configured to give a 10% discount on the royalty. In this case, the predetermined number of smart cards 120 can be inputted into the CPU of the business site 600 using a keyboard (e.g. 2402) and the CPU of the business site 600 can calculate a royalty according to a volume of smart cards 120. Thus, if the volume exceeds a predetermined threshold, the royalty is discounted.

The cost of the transaction may be a fixed cost (e.g. a royalty or product cost) agreed to between the administrator of the merchant server 200 and the administrator of the business site 600. For example, the administrator of the merchant server 200 may agree to pay the administrator of the business site 600, one cent per each transaction corresponding to the requested URL. Alternatively, the cost of the transaction for the administrator of the merchant server 200 can be based on a number of pages transmitted and printed, the number or type of documents to be transmitted and printed, and/or the total size of data being transmitted, as described above. Finally, by executing the transaction monitoring service 652, the CPU of the Business Site 600 generates invoice data for the administrator of merchant server 200 and the administrator of the business site 600 invoices the administrator of the merchant server 200 by using traditional billing methods such as forwarding a monthly account/statement or by direct debiting a credit card in a traditional fashion.

As shown in FIG. 1, the smart card reader 170 is integrated into a printer 112. A further smart card module 110 is also provided with a printer 112 to perform the functions corresponding to those mentioned above with respect to the printer 106. The integrated arrangement of the smart card reader 112 may, for example, be attractive in public libraries where copying and printing machines prevail, yet facilities for providing direct Internet access for the general public are either limited or not provided. With such an arrangement, a user presenting a smart card 120 to such a printer 112 may perform the same transaction as that mentioned above whereupon the business site 600 may offset the implementation cost of the local server 700 (eg. the public library) by transferring some of the royalty obtained from the merchant server 200 to the administrator of the local server 700.

Figure 18:
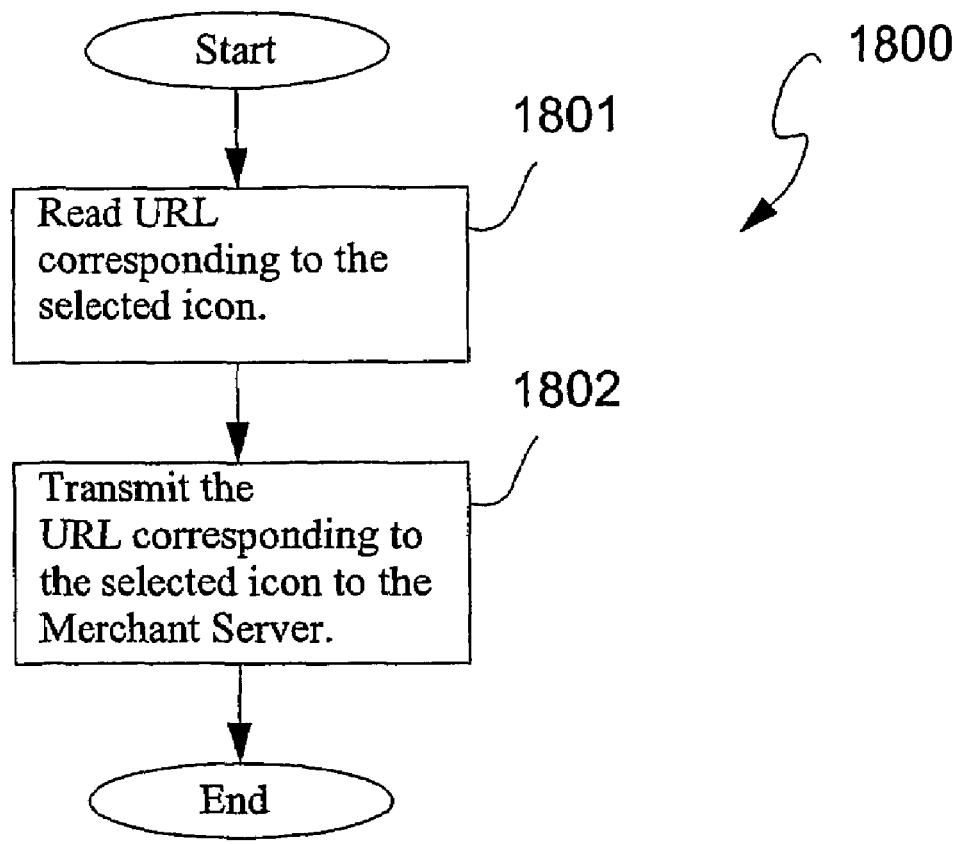
FIG. 18 is a flow chart showing a method of purchasing a pizza sourced over the system of FIG. 1.

FIG. 18 is a flow chart showing a method 1800 of purchasing a pizza sourced over a computer network using the smart card reader 160. A software program according to the method 1800 is preferably executed by a CPU (not shown) of the smart card reader 160, when the smart card 120 is inserted into the smart card reader 160. The administrator of the business site 600 can program and otherwise manufacture smart cards 120 customised for a pizza making and delivery service offered by an administrator of the merchant server 200. As described above, the programming and manufacturing of the smart cards 120 for the administrator of the merchant server 200 can be performed at a nominal cost to the administrator of the merchant server 200 or for free. The administrator of the merchant server 200 can distribute the smart cards 120 to prospective clients of the services provided by the merchant server 200. Those prospective clients may, for example, be existing subscribers to the merchant server 200. For example, the administrator of the merchant server 200 may deliver smart cards 120 by letterbox drop to all residences in the local vicinity of a pizza making facility owned and operated by the administrator of the merchant server 200. Alternatively, the administrator of the business site 600, may distribute smart cards 120 to prospective clients of the services provided by the merchant server 200. Smart cards 120 produced and distributed by the administrator of the merchant server 200 may include as the icons 124 thumbnail sized low resolution representations of different pizzas and/or pizza toppings able to be purchased from the merchant server 200.

A holder of a smart card 120 forming part of the system 100 inserts the smart card 120 into a smart card reader 160, 170 and selects a desired icon 124 according to which pizza the user wants delivered by the administrator of the merchant server 200. The holder of the smart card 120 can also select a desired icon 124 according to which ancillary items, for example, drinks or garlic bread the user wants delivered. In this manner, the holder of the smart card 120 need not make use of a client computer 800 to purchase the desired pizza from the merchant server 200.

The method 1800 begins at step 1801, where the CPU of the smart reader 160 reads the output of the touch panel 162 and correlates the output with a corresponding URL stored in the memory device 122. The correlation is performed using the mapping data that is stored in the memory device 122 (i.e. the CPU of the smart card reader 160 reads the URL corresponding to the selected icon). The URL stored in the memory device 122 of the smart card 120 corresponds to the Internet page of the pizza making and delivery service.

At the next step 1802, the CPU of the reader 160 transmits the distinguishing ID 510 and the corresponding URL to the merchant server 200 via the local server 700 and the Internet 130. The reader 160 can also be configured to transmit a residential/commercial address corresponding to the locality of the reader 160 to the merchant server 200. The URL is transmitted to the merchant server 200 via the local server 700 using traditional protocols (TCP/IP and HTTP). The URL is used to interrogate an associated URL located within the merchant server 200 to order the appropriate pizza and the merchant server 200 instructs the administrator of the pizza making facility to deliver the desired pizza to the address of the user. The residential/commercial address can be input into the merchant server 200 using the smart card reader 160 and can be registered in a customer table configured within merchant server 200 in advance. The pizza is subsequently delivered to the residential address of the user and the user can pay the administrator of the merchant server 200 in cash or by point of sale electronic funds transfer (EFTPOS) in the traditional fashion. Alternatively, the transmission of the (selected) URL is accompanied by the distinguishing ID of the smart card 120 in such a fashion that allows for the holder of the smart card 120 to be uniquely billed for the pizza provided through the selection of the appropriate icon 124. For example, since the holder of the smart card 120 can be known to the administrator of the merchant server 200, the pizza request can be automatically processed so that the holder of the smart card may be directly billed. This may be performed via the merchant server 200 using traditional billing methods such as forwarding a monthly account or statement or by direct debiting a credit card in a traditional fashion.

Figure 19:
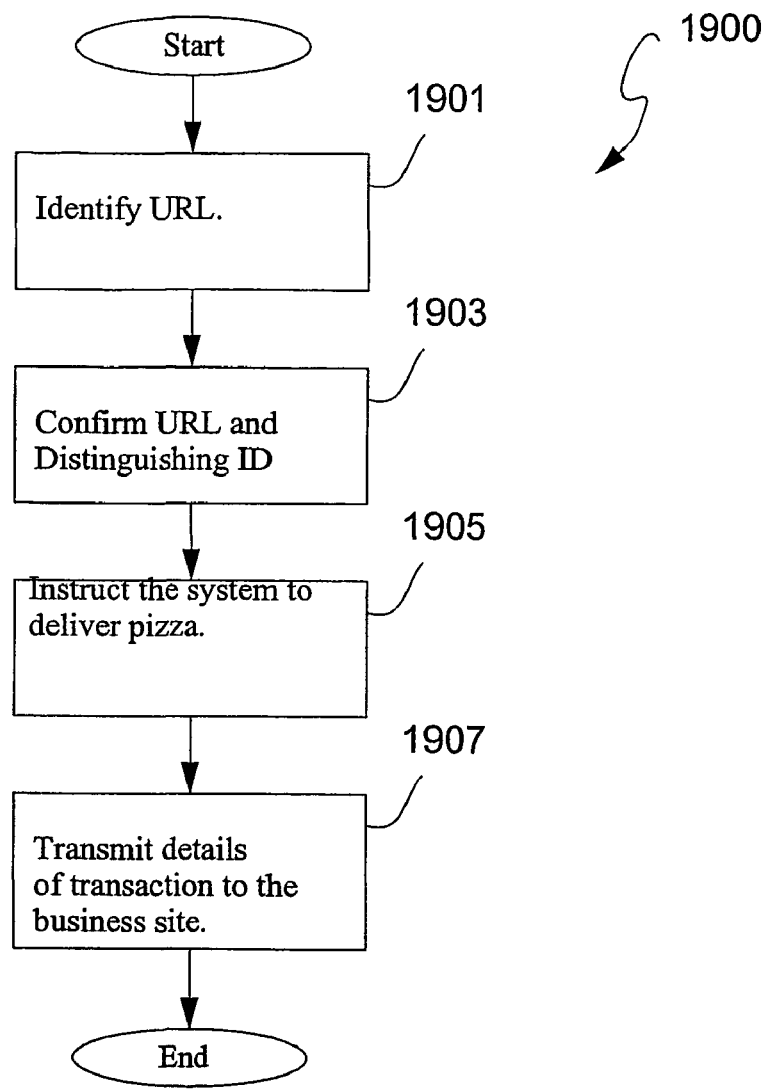
FIG. 19 is a flow chart showing the method of interrogation of the merchant server in accordance with the method of FIG. 18.

The interrogation of the merchant server 200 will now be described in more detail with reference to the method 1900 of FIG. 19. At step 1901, upon receipt of the URL by the merchant server 200, the CPU of the merchant server 200 executes a smart card system module 242 to identify the URL request as one arising from a smart card 120 forming part of the system 100, whereupon request is handled differently from traditional requests, for example those that may arise from the client computers 800. The process continues at the next step 1903, where upon the smart card request being identified, the system module 242 transfers control to an application module 244 whereupon the URL and distinguishing ID of the smart card 120 are confirmed together with the residential address or the commercial address. Once this information is processed, at the next step 1905, the application module 244 instructs an ordering system (not shown) of the pizza making facility to deliver the desired pizza to the residential address or the commercial address of the user. The process of method 1900 continues at the next step 1907, the CPU of the merchant server 200 executes the application module 244 to transmit details of the transaction being performed to the smart card business site 600, via the Internet 130. The application module 244 can also be configured to transmit a transaction success signal to the local server 700 for display on a client computer 800, since the local server 700 and client computer 800 are typically physically associated (located near) with the smart card reader 160.

As described above for the document printing implementation, within the business site 600 is a transaction monitoring service 652 configured to record smart card transactions described above being performed within the system 100, utilising the resources of the merchant server 200. The type of transaction information which can be transmitted to the transaction monitoring service 652 in the example of FIGS. 18 and 19 includes the distinguishing ID 510 of the smart card 120 customised for the pizza making and delivery service, a URL corresponding to the pizza making and delivery service Internet page, a signal indicating a transaction confirmation, the type of pizza ordered, the number of pizza's ordered in one transaction, an administrator identifier to identify an administrator of the merchant server 200, the number of times or period of time that the user accessed to the URL and/or any ancillary items ordered. With such an arrangement, the administrator of the business site 600, is able to obtain a royalty on a transaction basis for those transactions completed by the merchant server 200 in the manner described above for the document printing implementation. For example, the administrator of the merchant server 200 may agree to pay the administrator of the business site 600, one cent per each transaction corresponding to the URL of the pizza making and delivery service.

Figure 20:
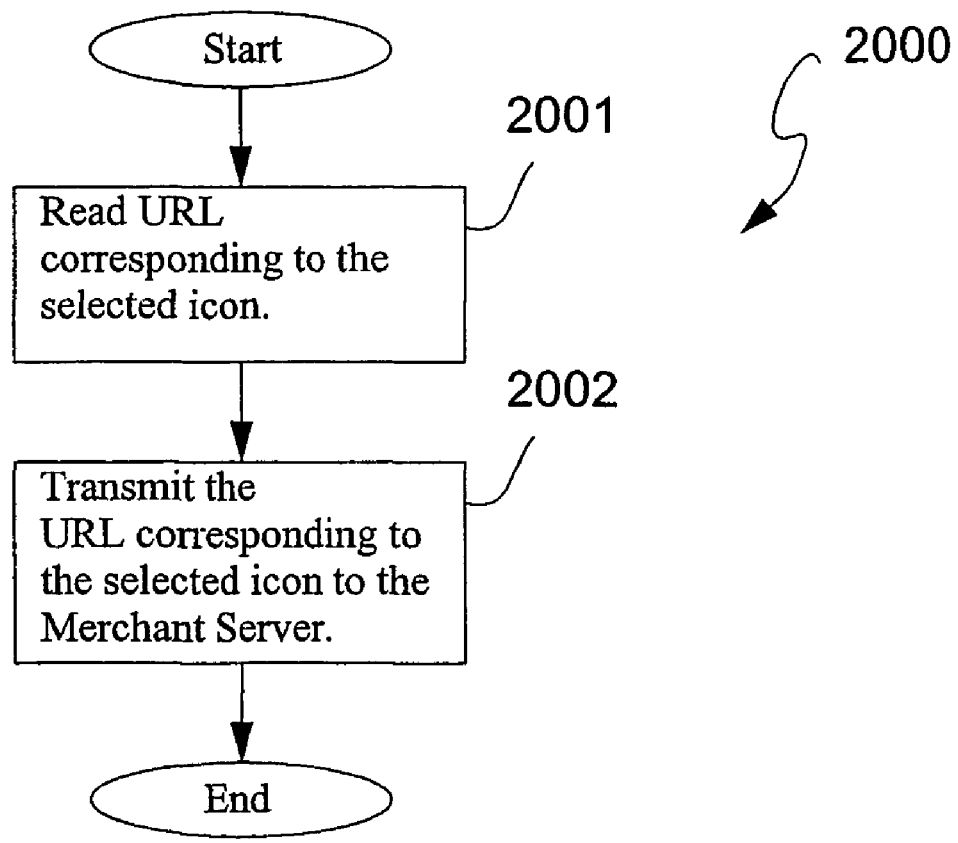
FIG. 20 is a flow chart showing a method of procuring a fitness training service over the system of FIG. 1.

FIG. 20 is a flow chart showing a method 2000 for procuring a personal training service sourced over a computer network using the reader 160. A software program according to the method 2000 is preferably executed by a CPU (not shown) configured within the smart card reader 160, when the smart card 120 is inserted into the smart card reader 160. The administrator of the business site 600 can program and otherwise manufacture smart cards 120 customised for a personal training service offered by an administrator of the merchant server 200 as described above. The administrator of the merchant server 200 can distribute smart cards 120 to prospective clients of the services provided by the merchant server 200. In one example, the administrator of the merchant server 200 may leave a number of smart cards 120 at the reception desk of a gymnasium, hotel or resort. Alternatively, the administrator of the business site 600, may distribute smart cards 120 to prospective clients of the services provided by the merchant server 200. Smart cards 120 produced and distributed by the administrator of the merchant server 200 may include as the icons 124, thumbnail sized low resolution representations of different types of fitness training packages able to be purchased from the merchant server 200. For example, the icons 124 may depict a person running, lifting weights, performing a remedial massage or the like.

A holder of a smart card 120 forming part of the system 100 inserts the smart card 120 into a smart card reader 160 and selects a desired icon 124 according to which fitness service the user wants to order from the administrator of the merchant server 200. The holder of the smart card 120 can also select a desired icon 124 according to a favoured appointment time that the user wishes to access the service. In this manner, the holder of the smart card 120 need not make use of a client computer 800 to access the service from the merchant server 200.

The method 2000 begins at step at step 2001, where the CPU of the smart card reader 160 reads the output of the touch panel 162 and correlates the output with a corresponding URL stored in the memory device 122. The correlation is performed using the mapping data that is stored in the memory device 122 (i.e. the CPU of the smart card reader 160 reads a URL corresponding to the selected icon). The URL stored in the memory device 122 of the smart card 120 corresponds to the Internet page of the fitness service.

The method 2000 continues at the next step 2002, where the CPU of the reader 160 transmits the distinguishing ID of the smart card 120 and the corresponding URL to the merchant server 200 via the local server 700 and the Internet 130. The reader 160 can also be configured to transmit a residential/commercial address (e.g. a hotel address and room number) that is designated by the user using smart card reader 160 corresponding to the locality of the reader 160, to the merchant server 200. In accordance with the present example, the reader 160 can be located in the home of the user, in a hotel or resort room. The URL is transmitted to the merchant server 200 via the local server 700 using traditional protocols (TCP/IP and HTTP). The transmitted URL is used to interrogate an associated URL located within the merchant server 200 to order the appropriate fitness service, and the merchant server 200 instructs a service system associated with the fitness service to send a fitness trainer to the address. A fitness trainer is sent to the address and the holder of the smart card 120 can pay the fitness trainer in cash or by point of sale electronic funds transfer (EFTPOS) in the traditional fashion. Alternatively, as described above, the transmission of the (selected) URL is accompanied by the distinguishing ID of the smart card 120 in such a fashion that allows for that holder to be uniquely billed for the fitness service provided through the selection of the appropriate icon 124. For example, since the holder of the smart card 120 can be known to the administrator of the merchant server 200, the request for the fitness service can be automatically processed so that the holder of the smart card 120 may be directly billed. This may be performed directly via the merchant server 200 using traditional billing methods such as forwarding a monthly account or statement or by direct debiting a credit card in a traditional fashion.

Figure 21:
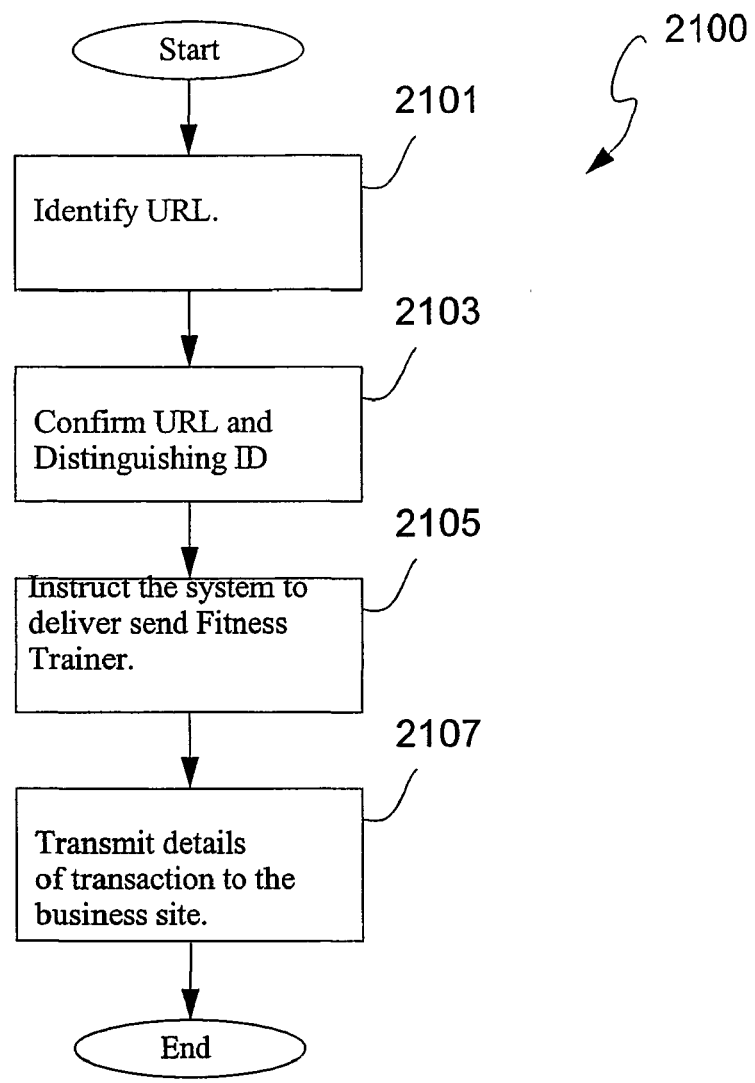
FIG. 21 is a flow chart showing the method of interrogation of the merchant server in accordance with the method of FIG. 20.

The interrogation of the merchant server 200 will now be described in more detail with reference to the method 2100 of FIG. 21. At step 2101, upon receipt of the URL by the merchant server 200, the CPU of the merchant server 200 executes a smart card system module 242 to identify the URL request as one arising from a smart card 120 forming part of the system 100, whereupon request is handled differently from traditional requests, for example those that may arise from the client computers 800. At the next step 2103, with the smart card request being identified, the system module 242 transfers control to an application module 244 whereupon the URL and distinguishing ID 510 of the smart card 120 are confirmed together with the residential address or commercial address. Once this information is processed, then at step 2105, the CPU of the merchant server 200 executes the application module 244 to instruct the service system of the fitness service to send a fitness trainer to the residential or commercial address. The process continues at the next step 2107, where by executing the application module 244, the CPU of the merchant server 200 transmits details of the transaction being performed to the smart card business site 600, via the Internet 130. The application module 244 can also be configured to transmit a transaction success signal to the local server 700 for display on a client computer 800, since the local server 700 and client computer 800 are typically physically associated (located near) with the smart card reader 160. In accordance with the example of FIG. 20, the transaction success signal can indicate the time that the fitness trainer will be able to perform the training session.

As described above for the document printing and pizza implementations, within the business site 600 is a transaction monitoring service 652 configured to record smart card transactions described above being performed within the system 100, utilising the resources of the merchant server 200. The type of transaction information which can be transmitted to the transaction monitoring service 652 in accordance with the example of FIGS. 20 and 21, can include the distinguishing ID of the smart card 120 customised for the fitness service, a URL corresponding to the fitness service Internet page, a signal indicating a transaction confirmation, the type of fitness training ordered, the time period of the training session ordered, an administrator identifier to identify an administrator of the merchant server 200 and/or the number of times or period of time that the user accessed the particular URL. With such an arrangement, the administrator of the business site 600, is able to obtain a royalty on a transaction basis for those transactions completed by the merchant server 200 in the same manner as the document printing implementation. For example, the administrator of the merchant server 200 may agree to pay the administrator of the business site 600, one cent per each transaction corresponding to the URL of the business service.

The card 120 described above preferably stores a data structure that describes various card properties and any icons or symbols 124 printed on the card 120. The card 120 can also include global properties that specify attributes such as information about the card, vendor (i.e. an administrator of a merchant server 200) and service/goods (e.g. pizzas). User-interface objects as described below, if present, specify data to associate with areas of the surface of the card 120.

User-interface objects represent mapping data, which relate predetermined areas, or iconic representations directly imprinted, on a surface of the card 120 to commands or addresses (eg: URLs) stored in the memory device 122. The mapping data includes the coordinates, which typically define the size and location of icons 124 on the card 120. In this connection, the icons 124 are generally referred to as User Interface (UI) elements, whilst the data relating to a particular icon 124 is generally referred to as a UI interface object.

The User-interface objects are preferably stored directly on the card 120 in the memory device 122. Alternatively, the User-Interface objects can be stored not on the card 120 itself, but in the system 100. For instance, the card 120 can store, via an on-card memory device 122, barcode or magnetic strip, a unique identifier which is unique to cards 120 having substantially similar icons and layout, as described above. The unique identifier together with the coordinates determined from the touch panel 162, as a result of a press, can be transmitted by the reader 160 to the merchant server 200 of the system 100. The system 100 can have the user-interface objects stored on the merchant server 200 and can perform the mapping from the determined coordinates to a corresponding command, address or data relevant to information (or goods and services) associated with a pressed icon 124 on the card 120. Thus, in this instance data related to the user selected icon 124 includes the coordinates determined by the reader 160 as a result of a press by the user on a portion of the touch panel 162 which overlays the desired icon.

The card 120 described above with reference to FIG. 2, stores data including a card header followed by zero or more objects as described below.

Figure 5:
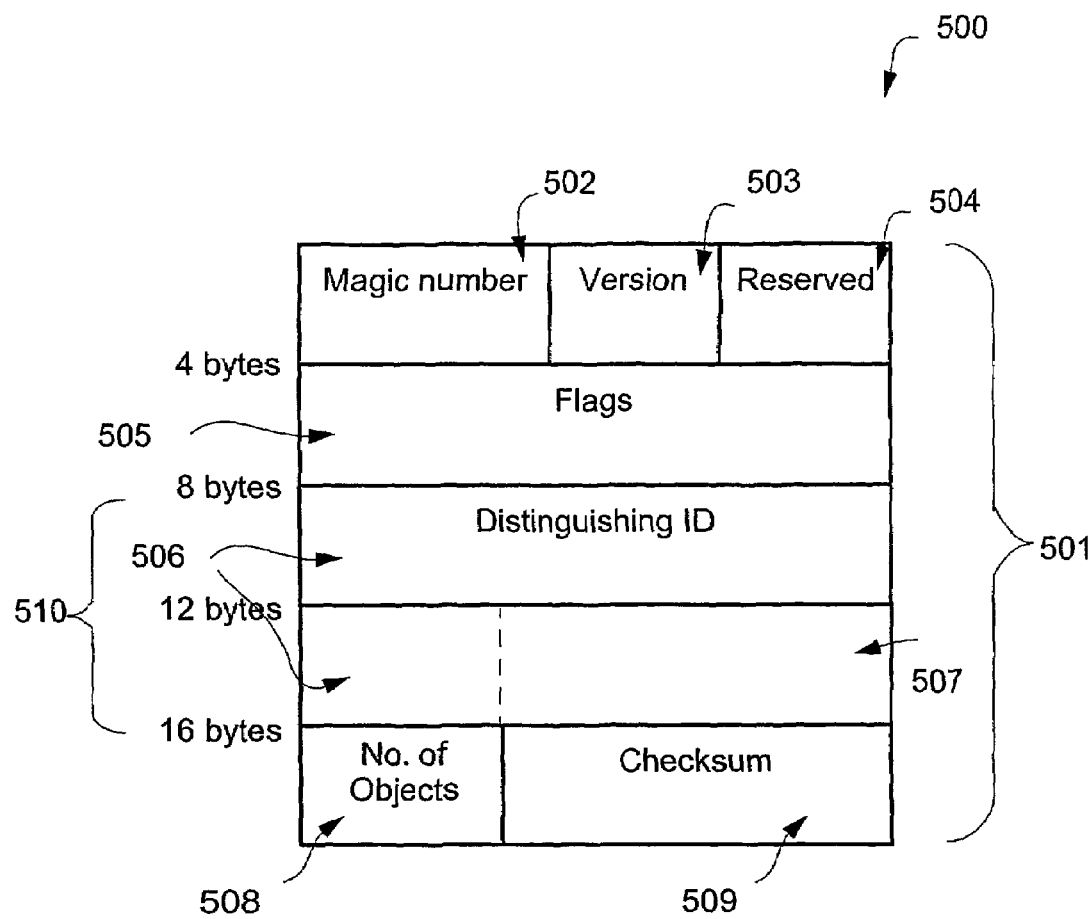
FIG. 5 shows the data structure of a card header as stored in the card of FIG. 1.

FIG. 5 shows the data structure of a card header 500 as stored in the smart card 120. The header 500 includes a number of rows 501, each of which represents four bytes of data. The data is in "big endian" format. The complete header is 20 bytes long and includes the following fields (described in FIG. 6):

(i) magic number field 502, which includes a constant that specifies a card as being a valid memory card; for example, the magic number field 502 can be used to check or verify that a propriety card belonging to a particular merchant/manufacture/vendor is being used.

(ii) versions field 503, which includes each version increment that specifies a change in the card layout that can not be read by the reader 160, 170 that is compatible with lower versions of the layout;

(iii) reserved field 504, this field 504 is reserved for future use;

(iv) flags field 505, which includes flags for a card (see FIG. 7);

(v) distinguishing identifier field 510, which includes two fields—a service 506 and a service specific 507 field, the service field identifies a service (e.g. a specific URL) of the card and the service specific field optionally contains a service-specific value;

(vi) a number of objects field; which includes a number value representing how many objects follow the header. This field can be set to zero; and (vii) a checksum field, which includes a card checksum of all data on the card 120 excluding the checksum itself.

The service identifier contained in the field 506 distinguishes one service from another or one merchant from another. That is, the service is identified by an application that provides the service to a smart card 120 holder.

The service-specific identifier contained in the field 507 can be optionally used by the merchant of a service to provide predetermined functions of a particular service provided at an Internet page addressed by a particular URL. The use of the service-identifier is substantially dependent upon an application running on the system 100. For example, the service identifier 506 together with the service-specific identifier 507 can be used as a unique identifier for a card 120, as described above, to gain or deny access to a specific feature of a particular Internet page providing particular goods/service(s); to reproduce a specific-service identifier value in a log file to confirm or verify that a particular card 120 having that value was used to access a particular Internet page/service; and to provide a unique identifier that can be matched up with a corresponding value in a database to retrieve information about the user of the Internet page/service (eg: name, address, credit card number etc).

Other examples of uses of the service-specific identifier 507 can include providing information about a mechanism or mode of distribution of the cards 120 (e.g. by mail, bus terminal kiosks, handed out on a train etc). The service-specific identifier 507, for instance, can identify what data should be loaded into the system 100 when a particular Internet page/service is accessed. The foregoing is not intended to be an exhaustive list of possible applications of the service-specific identifier 507 but a small sample of possible applications and there are many other applications of the service-specific identifier 507.

The flags field 505 of the header 500 of FIG. 5 includes three flags as follows:
(i) Don't beep;
(ii) No move events; and
(iii) No event co-ordinates.

FIG. 6 shows a description of each of the above flags. The above flags affect the functions that the smart card 120 can perform in a reader 160, 170, as is defined by the description of each flag. An example, of a User Interface (UI) element as referred to in FIG. 6 is an icon 124 on the card 120. UI Elements will be explained in further detail later in this document.

Immediately following the card header 500 of FIG. 5 can be zero or more object structures defining the objects of a particular card 120 and forming part of the card data, where each object structure has an object header. The object header may include four fields as follows:
(i) a type field;
(ii) an object flags field;
(iii) a length field; and
(iv) a data field.

The structure of the data field depends on the object type as will be described below.

FIG. 8 shows a description of each of the fields of the object header 500 for the card 120. The flags field 505 of the object header of FIG. 5, preferably includes an inactive flag. FIG. 9 shows a description of the inactive flag for the card 120.

There are preferably five object types provided in the card 120, as follows:
(i) User Interface (UI) objects (i.e. data defining an icon 124 on the card 120);
(ii) Card Data;
(iii) Fixed Length Data;
(iv) Reader Insert;
(v) No operation; and
(vi) No operation (single byte).

FIG. 10 shows a description of each of the above object types (i) to (vi). Each UI object defines a rectangular area on the card 120 and some quantity of associated data that is transmitted when the user touches an area of the touch panel 162 over the corresponding rectangular area of the card 120. The origin for the co-ordinate mapping system is the top left of the smart card 120 as if the card 120 was held in a portrait view as seen in FIG. 2. For any reader 160, 170 that does not use this card orientation, the values of the corner points must be adjusted by the reader 160, 170 so as to report a correct icon press.

The UI (element) object structure preferably has six fields in accordance with the card 120 described, as follows:
(i) a flags field;
(ii) an X1 field;
(iii) an Y1 field;
(iv) an X2 field;
(v) a Y2 field; and
(vi) a data field which typically includes data associated with the UI element for example, a URL, a command, a character or name.

FIG. 11 shows a description of each of the above fields for the UI object structure of the described card. A press on the pressure sensitive touch panel 162 is defined to be inside a particular UI object if:
(i) the X value of the press location is greater than or equal to an $X_1$ value of the associated UI object and is strictly less than an $X_2$ value for that particular UI object; and (ii) the press Y value for the press location is greater than or equal to a $Y_1$ value of the particular UI element and strictly less than a $Y_2$ value.

Overlapping UI elements is allowed. If a press is within the bounds of more than one UI element then the object sent is determined by a Z order. The order of the UI elements on the card 120 defines the Z ordering for all of the UI elements on that particular card 120. The top UI element is the first UI element for a particular card. The bottom UI element is the last UI element for that particular card. This allows for non-rectangular areas to be defined. For example, to define an "L" shaped UI element, a first UI object would be defined with zero bytes in the data field, and a second UI object would be defined to the left and below the first UI object but overlapping the UI object. The location of a press is to be reported in "fingers", which represent finger elements (analogous to "pixels" which represent picture elements). The height of a fingel is defined to be 1/256th of the length of an International Standards Organisation (ISO) memory smart card and the width is defined to be 1/128th of the width of an ISO memory smart card. The behaviour associated with each element may be modified with one of more flags. Each UI element preferably has four flags associated with it as follows:

(i) Invert Beep Enable;
(ii) Auto repeats;
(iii) Do Not Send Data on Press; and
(iv) Do Not Send Data on Release.

FIG. 12 shows a description for each of the UI element flags.

The card data object is used to store data specific to a particular card 120. The data layout for this object presently has no fixed form.

The fixed length data object is used to define a fixed length block on the card 120 that can be written to by the computer 100, for example.

The reader insert object is to used to store instructions for the reader 160, 170 when a particular card 120 is inserted. The reader insert object can be used, for example, to instruct the reader 160,170 to use a specific configuration of Infrared (IR) commands to allow communication with a specific computer, set top box and/or TV, for example.

The No Operation object is used to fill in unused sections between other objects on a particular card 120. Any data stored in the no operation object is ignored by the reader 160, 170. Any unused space at the end of the card 120 does not need to be filled in with a no operation object.

The No Operation (One Byte) object is used to fill gaps between objects that are too small for a full object header. These objects are only one byte long in total.

The remote reader 160, 170 preferably uses a datagram protocol that supports both uni-directional and bidirectional communication between the remote reader 160, 170 and a client computer 800, for example. The format used for messages from the remote reader 160, 170 as a result of user interactions with the remote reader 160, 170 are of a different format than those that are sent to the remote reader 160, 170.

There are at least seven message event types that can be sent by the remote reader 160, 170. These events are as follows:

INSERT: When a card 120 is inserted into the remote reader 160,170 and the card 120 is validated, an INSERT event is generated by the remote reader 160, 170 and an associated message is transmitted. This message announces the card 120 to a receiver (e.g. a client computer 800). The INSERT message preferably includes the particular distinguishing identifier 510 and allows applications to be started or fetched immediately upon card 120 insertion rather than waiting until the first interaction takes place.

REMOVE: When a card 120 is removed from the remote reader 160,170, a corresponding REMOVE event is generated and a REMOVE message is sent to the particular receiver associated with the remote reader 160, 170. Like the INSERT message, the associated distinguishing identifier 510 is transmitted along with the message. As the identifier cannot be read from the now removed card 120, the identifier is stored in the memory of the remote reader 120. This is a useful optimisation as the distinguishing identifier 510 is required for all other messages and reading the identifier from the card 120 each time the identifier is required can be too slow. INSERT and REMOVE messages are not relied upon by the system 100 to control processing. The system 100 is preferably configured to infer missing messages if a message is received and is not immediately expected. For example, if an application sees two INSERT messages in a row, then an application can assume that it has missed the REMOVE message associated with the card of the first INSERT message as it is not possible to have two cards inserted at one time. The application can then take whatever action is required prior to processing the second INSERT message. Another example of where a missing message can occur is where a hand-held, infra-red connected reader, as compared with a wired reader, is being used. Often a user does not point the reader directly at a receiver when inserting or removing cards. This problem can be corrected by the system 100 inferring the INSERT or REMOVE operations based on differing distinguishing identifiers in consecutive PRESS and RELEASE pairs.

BAD CARD: If an invalid card is inserted, then the remote reader 160, 170 is preferably configured to generate a BAD CARD event and to send a BAD CARD message. This message allows an associated receiver to take some action to alert the user to the invalid card.

PRESS: When a touch is detected by the remote reader 160, 170 and the position of the touch maps to a user-interface object, a PRESS event is generated and a PRESS message is sent to an associated receiver. The PRESS message contains details of the associated card, the position of the press and the data associated with the user-interface element at that particular position. If there is no user interface element defined for that position (including if there is no user interface elements defined on the card 120 at all) a PRESS message is sent containing details of the associated card and the position of the press. If there is no card present in the remote reader 160, 170 when a PRESS event is generated then a PRESS message is sent containing the special "NO_CARD" identifier (i.e eight bytes of zero—0x00) and the position of the press.

RELEASE: A RELEASE event complements the PRESS event and a RELEASE message can be sent in order to inform an application program of the system 100 that a PRESS has been lifted. Every PRESS event preferably has a corresponding RELEASE event. Readers can allow multiple presses to be registered or provide other events that may occur between PRESS and RELEASE messages.

MOVE: If, after processing a PRESS event, the touch position changes by a certain amount then the finger (or whatever is being used to touch the card) is assumed to be moving. MOVE EVENTS are generated and MOVE messages are sent until the touch is lifted. MOVE events auto-repeat by re-sending the last MOVE messages when the touch position remains stationary. Auto-repeat finishes when the touch is lifted and a corresponding RELEASE message is sent. Unlike PRESS and RELEASE events there is no user-interface object involved with MOVE events.

LOW BATT: A LOW BATT event is generated and a LOW BATT message is sent when a battery (not illustrated) in the remote reader 160, 170 is getting low. This message is sent after user interactions to increase the chance that the message will be received by the rest of the system 100. The sending of the LOW BATT message does not prevent the remote reader 160, 170 from entering a low power state.

The preferred data format for the system 100 is a fixed size header followed by a variable length data field which can be zero bytes or more in length, followed by an eight bit check-sum and complement.

The message header is preferably of a fixed length and is pre-pended to all messages sent from the remote reader 160, 170. It is necessary to keep the message header as small as possible due to any bandwidth restrictions that may be imposed. FIG. 13 shows the format of the message header that is sent from a remote reader 160, 170.

Service 506 and service-specific 507 identifiers can be assigned, by a smart card identification authority, to a merchant when the merchant registers a particular service. The service 506 and service-specific identifier 507 are the same for every message from a given card 120. A service specific identifier is preferably set by a merchant for use with their application.

FIG. 14 shows a table listing the message event types that have been described above.

A number of message types are considered simple in that they consist solely of the message header described above followed by the message checksum byte and its complement. For example, a BADCARD message is a simple message.

FIG. 15 shows the format of a simple message. MOVE messages are formed of the message header described above followed by two fields defining the co-ordinates of the touch position on the touch panel 162 of the remote reader 160, 170. FIG. 16 shows the format of a MOVE message.

FIG. 17 shows the format of PRESS and RELEASE messages. PRESS and RELEASE messages, like MOVE messages contain the message header and touch coordinates. In addition, PRESS and RELEASE messages send data associated with the user-interface element if the touched position matches a user-interface element/icon 124 defined on the card 120. This data is of variable length, the actual size being defined by a corresponding card 120. If the touched position does not match a user-interface element defined on the card 120 (including if no user-interface elements are defined on the card 120), zero bytes of data associated with user interface elements are sent. If there is no card 120 in the reader 160, 170 then the service identifiers are all set to zero (ie 0×00) and zero bytes of data associated with the user-interface elements are sent. The data associated with the UI element normally corresponds to the data associated with the user interface element defined on the card 120 but may be modified or generated by processing on the card 120 or reader 160, 170.

The system 100 provides a number of advantages to each of the individuals represented. Firstly, the holder of the smart card 120 is not required to have access to a client computer 800 and thus need not go through the laborious effort of logging onto the Internet, searching and finding the merchant server 200 and then finding and selecting the required information. Such information occurs automatically upon selection of the appropriate icon 124 once the card 120 is inserted into the reader 160.

The system 100 is also more secure than the traditional methods of document purchase in that the merchant server 200, who has pre-existing knowledge of the holder of the smart card 120, need not seek specific authorisation for every transaction being performed, but may merely implement the transaction based on a previous transaction history of the holder which would be known to the merchant server 200. Account billing and transaction details may be retained in a confidential manner by the server 200 and thus need not be transmitted in an "open" fashion over the Internet 130. A further advantage for the merchant server 200 is that, regardless of the size or cost of the goods/services that may be supplied, the cost of programming smart cards 120 and delivering them (eg. by mail) to users, is fixed, and substantially reduces the risk associated with periodic generation and supply of goods/services to subscribers.

The system 100 is also advantageous for the business site 600 who may offer a variety of smart card services to one or more merchant servers 200, each forming part of the system 100. The arrangement allows for the business site 600 to monitor all transactions and thus obtain an income typically representing a small percentage of the transaction costs. The transaction costs may be provided on a per page basis, on a per document basis, on a total size of data being transmitted, on the number of transactions or on the type and/or cost of goods/services supplied by the administrator of a merchant server 200. The system 100 also provides for a stream of revenue to the proprietor of the local server 700 in respect of those persons using printers located at connections to the local server.

In configurations where the local server 700 forms part of a business organisation, the smart cards 120 may also be programmed with the identification details of the business operating the local server 700. As a consequence, numerous employees of the business may utilise the same or a number of smart cards 120 whereby the charges for use may be billed to the business itself as opposed to the individual users.

A skilled person would realise that the system 100 can be used for many different applications and to provide many different goods and/or services over a computer network. Examples of applications of the system 100 include the printing of updates for service, software and other manuals. For example, a law book supplier may provide quarterly updates on case law and may distribute smart cards to each subscriber so that at the commencement of each quarter, the subscriber may utilise the smart card to directly print the previous quarter's regular updates. Another similar application is where a piece of equipment is purchased, the equipment being of relatively small cost, but where the cost of supplying an operating manual is prohibitive. In such circumstances, the smart card 120 may be provided with the item purchased and if it is necessary for the user to obtain an operating manual, such may be obtained through use of the smart card 120. Such a marketing approach may be appropriate for a large range of small size or inexpensive parts, such as integrated circuit devices, printed circuit boards, motor vehicle parts and other similar devices.

The system 100 may also be used for the printing of individual sections or parts of documents for particular purposes. For example, parts may be used to print information on transport timetables between defined destinations where the ordinary printing and distribution of such timetables would be prohibitive by cost. Information on certain medical conditions or treatments such as poisoning treatment, information on current exchange rates and other financial data may be obtained in a similar fashion. Smart cards 120 may be also used for the printing of aggregated content such as that available from various forms of smart or guided compilation services, such as personalised stocks and share prices, newsletters or information sheets. Smart cards 120 may also be used for the printing of tickets or other tokens required to enable authentication and execution of a particular service. For example, a smart card 120 may be purchased to entitle the user to attend twenty movie presentations at a local theatre. A reader and printer may be located at the local theatre whereupon on arrival, instead of purchasing tickets at the box office, the holder of the smart card may be afforded priority access to ticketing whereupon the printer automatically prints a ticket for the movie selected.

The system module 242 operates to record every request for printing of a document and/or the number of pages to be printed under the particular license conditions printed by the smart card business site to the server provider. System software 242 also sends notification to the transaction site 600 of the number of pages or documents or page count made. The software module 242 also implements billing the merchant at regular intervals at an agreed page or document value for all prints within an integral period.

A particular enhancement of the methods described herein lies in the incorporation into the smart card 120 an identification facility, thereby providing that only authorised persons may use the smart card 120 for its intended purpose. Such an enhancement may be formed by incorporating into each smart card 120 a PIN (personal identification number) pad function, this being realised by a number of the icons 124 being arranged as an alphanumeric keypad 126. Other icons 128 may be selectable to perform the specific desired printing function only after a valid PIN had been entered, these features being seen in FIG. 2.

The foregoing describes only some embodiments of the present invention and modifications can be made thereto without departing from the scope of the present invention.

The invention claimed is:

1. A networked printing system comprising:
   at least one smart card having a memory device programmed with access information corresponding to and associated with one or more icons formed on a surface of said smart card;
   a reader device coupled to a computer network, said smart card being locatable with said reader device to permit a reading of said memory device to associate said access information with one of said icons selected by a user pointing a touch panel of said reader device overlaying said icons;
   a printer device coupled to said network;
   a merchant server coupled to said network and configured to receive said access information from said reader in response to selection of said one icon, and in response thereto forward an electronic document for printing on said printer for retrieval by said user; and
   a transaction monitory server coupled to said network and configured to monitor the forwarding of said electronic document to said printer and to invoice at least one user of said network for costs associated with said printing.

2. A system according to claim 1 wherein said memory device further comprises identification information related to said user, said identification information being transmitted with said access information to said merchant server to enable cost associated with said printing to be invoiced to said user.

3. A system according to claim 1 wherein said reader device further transmits a network address of said printer to said merchant server thereby enabling said merchant server to use said network address to forward said electronic document to said printer.

4. A system according to claim 1 wherein said reader device and said printer are unitarily formed.

5. A system according to claim 4 wherein said one user is selected from the group consisting of said merchant server, said user, and a local server to which said printer and reader device are associated.

6. A method of producing a document sourced from a computer network, based on a smart card smart card having a memory device programmed with access information corresponding to and associated wit one or more icons formed on a surface of said smart card, said smart card being locatable with a reader device coupled to said network to permit a reading of said memory device to associate said access information with one of said icons selected by a user pointing a touch panel of said reader device overlaying said icons, said method comprising the steps of:
   transmitting said access information from said reader to a merchant server coupled to said network in response to selection of said one icon; and
   forwarding an electronic document from said merchant server to a printer coupled to said network for printing said electronic document on said printer and for retrieval by said user.

7. A method according to claim 6 wherein said memory device further comprises identification information related to said user, said identification information being transmitted with said access information to said merchant server to enable cost associated with said printing to be invoiced to said user.

8. A method according to claim 6 wherein said reader device further transmits a network address of said printer to said merchant server thereby enabling said merchant server to use said network address to forward said electronic document to said printer.

9. A method according to claim 6 wherein said reader device and said printer are unitarily formed.

10. A method according to claim 6 further comprising the steps of:
    monitoring the forwarding of said electronic document to said printer;
    and invoicing at least one user of said network for costs associated with said printing.

11. A method according to claim 10, wherein said monitoring and invoicing is performed by a transaction monitory server coupled to said network.

12. A method according to claim 11 wherein said one user is selected from the group consisting of said merchant server, said user, and a local sewer to which said printer and reader device are associated.

13. A method of procuring goods and/or services, using a merchant sewer coupled to a computer network, based on a smart card having a memory device programmed with access information corresponding to and associated with one or more icons formed on a surface of said smart card, said smart card being locatable with a reader device coupled to said network to permit a reading of said memory device to associate said access information with one of said icons selected by a user pointing a touch panel of said reader device overlaying said icons, said method comprising the steps of:

transmitting said access information from said reader device to said merchant server in response to selection of said one icon;

utilising said merchant sewer to provide said goods and/or services for retrieval by said user according to said access information;

monitoring said transmission of said access information to said merchant server; and invoicing at least one user of said network for costs associated with provision of said goods and/or services.

14. A method according to claim 13 wherein said memory device further comprises identification information related to said user, said identification information being transmitted with said access information to said merchant server to enable cost associated with provision of said goods and/or services to be invoiced to said user.

15. A method according to claim 13 wherein said reader device further transmits a network address of said reader device to said merchant server thereby enabling said merchant server to use said network address to forward said goods and/or services to said user.

16. A method according to claim 13 wherein said reader device and said printer are unitarily formed.

17. A method according to claim 13, wherein said monitoring and invoicing is performed by a transaction monitory server coupled to said network.

18. A method according to claim 13 wherein said one user is selected from the group consisting of said merchant server, said user, and a local server to which said reader device are associated.

19. A method according to claim 13, where said goods and/or services are selected from the group of consisting of a pizza service, a massage service and a printing service.

20. A network system for providing goods and/or services, said network system comprising:

at least one smart card having a memory device programmed with access information corresponding to and associated with one or more icons formed on a surface of said smart card;

a reader device coupled to a computer network, said smart card being locatable with said reader device to permit a reading of said memory device to associate said access information with one of said icons selected by said user pointing a touch panel of said reader device overlaying said icons;

a merchant server coupled to said network and configured to receive said access information from said reader device in response to selection of said one icon, and in response thereto enable provision of said goods and/or services for retrieval by said user; and a transaction monitoring server coupled to said network and configured to monitor the forwarding of said access information to said merchant server and to invoice at least one user of said network for costs associated with said goods and/or services.

21. A system according to claim 20, wherein said memory device further comprises identification information related to said user, said identification information being transmitted with said access information to said merchant server to enable cost associated with said printing to be invoiced to said user.

22. A system according to claim 20 wherein said reader device further transmits a network address of said reader device to said merchant server thereby enabling said merchant server to use said network address to forward said goods and/ar services to said user.

23. A system according to claim 20 wherein said reader device and said printer are unitarily formed.

24. A system according to claim 20 wherein said one user is selected from the group consisting of said merchant server, said user, and a local server to which said reader device is associated.

25. A merchant server for sourcing goods and/or services based on a smart card having a memory device programmed with access information corresponding to and associated with one or more icons formed on a surface of said smart card, said smart card being locatable with a reader device, said reader device being coupled to a computer network to permit a reading of said memory device to associate said access information with one of said icons selected by a user pointing a touch panel of said reader device overlying said icons, said merchant server comprising:

a connecting means for connecting to said network;

a receiving means for receiving said access information transmitted from said reader device in response to selection of said one icon; and a forwarding means for forwarding said goods and/or services for retrieval by said user.

26. A merchant server according to claim 25, wherein said merchant server is further configured to forward further information to a transaction monitory sewer coupled to said network, said transaction monitory server being configured to monitor the forwarding of said access information to said merchant server and to invoice at least one user of said network for costs associated with said goods and/or services.

27. A transaction monitoring server for monitoring transactions on a computer network based on a smart card, said smart card having a memory device programmed with access information corresponding to and associated with one or more icons formed on a surface of said smart card, said smart card being locatable with a reader device coupled to said network to permit a reading of said memory device to associated said access information with one of said icons selected by a user pointing a touch panel of said reader device overlaying said icons, said transaction monitoring server comprising:

a network connecting means for connecting to said network;

a monitoring means for monitoring the forwarding of said access information transmitted from said reader device in response to selection of said one icons; and an invoicing means for invoicing at least one user of said network for costs associated with said forwarding of said access information.

28. A program for producing a document, sourced from a computer network, based on a smart card having a memory device programmed with access information corresponding to and associated with one or more icons formed on a surface of said smart card, said smart card being locatable with a reader device coupled to said network to permit a reading of said memory device to associate said access information with one of said icons selected by a user pointing a touch panel of said reader device overlaying said icons, said program comprising:

code for transmitting said access information from said reader to said merchant server in response to selection of said one icon; and code for forwarding an electronic document from said merchant server to a printer coupled to said network for printing said electronic document on said printer and for retrieval by said user.

29. A program according to claim 28, wherein said program is stored in a memory medium and is executed by a processor configured within an apparatus.

30. A program for procuring goods and/or services based on a smart card having a memory device programmed with access information corresponding to and associated with one or more icons formed on a surface of said smart card, said smart card being locatable with a reader device coupled to a computer network to permit a reading of said memory device to associate said access information with one of said icons selected by a user pointing a touch panel of said reader device overlaying said icons, said program comprising:
- code for transmitting said access information from said reader to a merchant server coupled to said network in response to selection of said one icon;
- code for utilising said merchant server to provide said goods and/or services for retrieval by said user according to said access information;
- code for monitoring said transmission of said access information to said merchant server; and
- code for invoicing at least one user of said network for costs associated with provision of said goods and/or services.

31. A program according to claim 30, wherein said program is stored in a memory medium and is executed by a processor configured within an apparatus.

32. A computer readable medium, having a program recorded thereon, where the program is configured to make a computer execute a procedure to produce a document, sourced from a computer network, based on a smart card having a memeory device programmed wit access information corresponding to and associated with one or more icons formed on a surface of said smart card, said smart card being locatable with a reader device coupled to said network to permit a reading of said memory device to associate said access information with one of said icons selected by a user pointing a touch panel of said reader device overlaying said icons, said program comprising:
- code for transmitting said access information from said reader device to a merchant server coupled to said network in response to selection of said one icon; and
- code for forwarding an electronic document from said merchant server to a printer coupled to said network for printing said electronic document on said printer and for retrieval by said user.

33. A computer readable medium, having a program recorded thereon, where the program is configured to make a computer execute a procedure to procure goods and/or services based on a smart card having a memory device programmed with access information corresponding to and associated with one or more icons formed on a surface of said smart card, said smart card being locatable with a reader device coupled to said network to permit a reading of said memory device to associate said access information with one of said icons selected by a user pointing a touch panel of said reader device overlaying said icons, said program comprising:
- code for transmitting said access information from said reader to a merchant server coupled to said network in response to said one icon;
- code for utilising said merchant server to provide said goods and/or services for retrieval by said user according to said access information;
- code for monitoring said transmission of said access information to said merchant server; and
- code for invoicing at least one user of said network for costs associated with provision of said goods and/or services.

* * * * *

UNITED STATES PATENT AND TRADEMARK OFFICE
CERTIFICATE OF CORRECTION

PATENT NO. : 7,165,714 B2
APPLICATION NO. : 10/362584
DATED : January 23, 2007
INVENTOR(S) : Robertson It is certified that error appears in the above-identified patent and that said Letters Patent is hereby corrected as shown below:

COLUMN 2:
Line 1, "assess" should read -- access --; and
Line 12, "service" should read -- server --.

COLUMN 7:
Line 20, "19 21" should read -- 19, 21 --.

COLUMN 9:
Line 15, "card 120 al." should read -- card 120. --.

COLUMN 14:
Line 25, "pizza's" should read -- pizzas --.

COLUMN 19:
Line 18, "fingel", should read -- "finger" --; and
Line 22, "one of" should read -- one or --.

COLUMN 23:
Line 26, "an" should read -- of an --.

COLUMN 24:
Line 13, "smart card smart card" should read -- smart card --;
Line 15, "wit" should read -- with --;
Line 54, "sewer" should read -- server --; and
Line 58, "sewer" should read -- server --.

COLUMN 25:
Line 4, "sewer" should read -- server --; and
Line 67, "and/ar" should read -- and/or --.

COLUMN 26:
Line 26, "sewer" should read --server --;
Line 38, "associated" should read -- associate --; and
Line 46, "icons;" should read -- icon; --.

UNITED STATES PATENT AND TRADEMARK OFFICE
CERTIFICATE OF CORRECTION

PATENT NO. : 7,165,714 B2
APPLICATION NO. : 10/362584
DATED : January 23, 2007
INVENTOR(S) : Robertson It is certified that error appears in the above-identified patent and that said Letters Patent is hereby corrected as shown below:

COLUMN 27:
Line 31, "memeory" should read --memory --; and
Line 31, "wit" should read -- with --.

Signed and Sealed this

Eleventh Day of March, 2008

JON W. DUDAS
*Director of the United States Patent and Trademark Office*